(12) United States Patent
Huang et al.

(10) Patent No.: US 11,323,973 B2
(45) Date of Patent: *May 3, 2022

(54) INFORMATION SENDING AND RECEIVING METHOD AND RELATED DEVICE

(71) Applicant: Huawei Technologies Co., Ltd., Shenzhen (CN)

(72) Inventors: Huang Huang, Chengdu (CN); Gao Xiang, Chengdu (CN); Kuandong Gao, Chengdu (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,020

(22) Filed: Apr. 3, 2020

(65) Prior Publication Data
US 2020/0245274 A1    Jul. 30, 2020

Related U.S. Application Data

(63) Continuation of application No. 16/558,889, filed on Sep. 3, 2019, now Pat. No. 10,616,843, which is a
(Continued)

(30) Foreign Application Priority Data

May 4, 2017   (CN) .......................... 201710309704.0

(51) Int. Cl.
H04W 56/00    (2009.01)
H04L 5/10     (2006.01)
H04L 5/00     (2006.01)

(52) U.S. Cl.
CPC ......... H04W 56/001 (2013.01); H04L 5/0051 (2013.01); H04L 5/10 (2013.01); H04L 5/0016 (2013.01)

(58) Field of Classification Search
None
See application file for complete search history.

(56) References Cited

U.S. PATENT DOCUMENTS

2005/0229082 A1   10/2005 Kawamae et al.
2015/0092768 A1   4/2015  Ng et al.
(Continued)

FOREIGN PATENT DOCUMENTS

CN    102893550 A    1/2013
CN    106165334 A    11/2016
(Continued)

OTHER PUBLICATIONS

"3rd Generation Partnership Project; Technical Specification Group Radio Access Network; NR;Radio Resource Control (RRC); Protocol specification (Release 15 )" 3GPP TS 38.331 V0.0.2 (Mar. 2017), 13 pages.
(Continued)

Primary Examiner — Eunsook Choi
(74) Attorney, Agent, or Firm — Slater Matsil, LLP

(57) ABSTRACT

Embodiments of this application disclose an information sending and receiving method and a related device. The method may include: sending, by a network device, first indication information to a terminal device, where the first indication information is carried by using m bits in a downlink signal, and the first indication information includes related information indicating a quantity n of synchronization signal blocks SS blocks included in a synchronization signal burst set SS burst set, where $m < \log_2 N$, N is a maximum value of a quantity of SS blocks supported in the SS burst set, both m and n are integers greater than 1, and n is less than or equal to N. According to the embodiments of this application, a prior-art problem that transmission overheads are relatively high when the network device
(Continued)

indicates the quantity n of SS blocks to the terminal device can be resolved.

26 Claims, 6 Drawing Sheets

Related U.S. Application Data continuation of application No. PCT/CN2018/081805, filed on Apr. 4, 2018.

(56) References Cited

U.S. PATENT DOCUMENTS

| | | | |
|---|---|---|---|
| 2015/0156752 A1* | 6/2015 | Liu | H04W 72/042 370/329 |
| 2017/0094624 A1 | 3/2017 | Balachandran et al. | |
| 2017/0289967 A1 | 10/2017 | Yu et al. | |
| 2018/0167946 A1 | 6/2018 | Si et al. | |
| 2018/0248642 A1* | 8/2018 | Si | H04L 5/0092 |
| 2018/0262308 A1* | 9/2018 | Si | H04L 27/2613 |
| 2018/0302202 A1 | 10/2018 | Kim et al. | |
| 2019/0200306 A1 | 6/2019 | Ko et al. | |
| 2019/0260452 A1 | 8/2019 | Zhang et al. | |
| 2019/0327030 A1 | 10/2019 | Yoshimoto et al. | |
| 2019/0349960 A1* | 11/2019 | Li | H04W 72/1242 |
| 2019/0357159 A1* | 11/2019 | Pan | H04L 1/1861 |
| 2019/0394736 A1 | 12/2019 | Huang et al. | |
| 2020/0037297 A1* | 1/2020 | Pan | H04B 7/0695 |

FOREIGN PATENT DOCUMENTS

| | | |
|---|---|---|
| RU | 2494551 C2 | 9/2013 |
| RU | 2504092 C2 | 1/2014 |
| WO | 2018201842 A1 | 11/2018 |

OTHER PUBLICATIONS

Ericsson, "SS burst set composition and SS time index indication," 3GPP TSG-RAN WG1 Meeting #88, R1-1702120, Athens, Greece, Feb. 13-17, 2017, 4 pages.

Ericsson, "SS Burst Set Composition," 3GPP TSG-RAN WG1 Meeting #88bis, R1-1706008, Spokane, U.S., Apr. 3-7, 2017, 3 pages.

Huawei, et al., "Discussion and evaluation on NR-SS multiplexing and bandwidth," 3GPP TSG RAN WG1 NR Ad Hoc Meeting, R1-1700033, Spokane, USA, Jan. 16-20, 2017, 12 pages.

Huawei, et al., "Discussion on SS burst set composition and SS block time index indication," 3GPP TSG RAN WG1 Meeting #88, R1-1703353, Athens, Greece, Feb. 13-17, 2017, 7 pages.

Huawei, et al., "Discussion on SS burst set composition and SS block time index indication," 3GPP TSG RAN WG1 Meeting #88bis, R1-1705052, Spokane, USA, Apr. 3-7, 2017, 9 pages.

Huawei, et al., "WF on SS Block Time Index Indication," 3GPP TSG RAN WG1 Meeting RAN1#88bis, R1-1706630, Spokane, USA, Apr. 3-7, 2017, 4 pages.

Intel Corporation, "SS Block Composition," 3GPP TSG RAN WG1 Meeting RAN1 #88bis, R1-1704708, Spokane, WA, U.S.A. Apr. 3-7, 2017, 3 pages.

LG Electronics, "Discussion on SS block, SS burst set composition and time index indication," 3GPP TSG RAN WG1 Meeting #88bis, R1-1704862, Spokane, USA Apr. 3-7, 2017, 8 pages.

Nokia, et al., "SS Bandwidth, Numerology and Multiplexing," 3GPP TSG-RAN WG1 NR AH Meeting, R1-1701056, Spokane, U.S.A., Jan. 16-20, 2017, 8 pages.

Nokia, et al., "SS Block Composition, SS Burst Set Composition and SS Time Index Indication," 3GPP TSG-RAN WG1 Meeting #88bis, R1-1705837, Spokane, WA, USA Apr. 3-7, 2017, 12 pages.

NTT Docomo, Inc., "Discussion on SS block composition, SS burst set composition and SS block index indication for NR," 3GPP TSG RAN WG1 Meeting #88bis, R1-1705705, Spokane, USA, Apr. 3-7, 2017, 8 pages.

Qualcomm Incorporated, "SS block, burst-set composition, and time index indication," 3GPP TSG-RAN WG1 NR #88bis, R1-1705565, Spokane, USA, Apr. 3-7, 2017, 9 pages.

Qualcomm Incorporated, "SS burst composition and time index indication considerations," 3GPP TSG-RAN WG1 NR #88, R1-1702585, Athens, Greece, Feb. 13-17, 2017, 6 pages.

Samsung, "SS block composition, SS burst set composition and SS time index," 3GPP TSG RAN WG1 #88bis, R1-1705318, Spokane, USA Apr. 3-7, 2017, 12 pages.

Samsung, "SS burst set composition and time index indication," 3GPP TSG RAN WG1 #88, R1-1702901, Athens, Greece, Feb. 13-17, 2017, 5 pages.

Samsung, "SS BW and multiplexing," 3GPP TSG RAN WG1 NR AH, R1-1700884, Spokane, USA, Jan. 16-20, 2017, 8 pages.

ZTE, et al., "Composition of SS block, burst and burst set," 3GPP TSG RAN WG1 Meeting #88bis, R1-1704358, Spokane, USA Apr. 3-7, 2017, 10 pages.

NTT Docomo, Inc., "Discussion and evaluation on NR-PBCH design", 3GPP TSG RAN WG1 Meeting #88bis, Spokane, WA, USA, Apr. 3-7, 2017, R1-1705708, 7 pages.

* cited by examiner

INFORMATION SENDING AND RECEIVING METHOD AND RELATED DEVICE

CROSS-REFERENCE TO RELATED APPLICATIONS

This application is a continuation of U.S. patent application Ser. No. 16/558,889, filed on Sep. 3, 2019, which is a continuation application of International Application No. PCT/CN2018/081805, filed on Apr. 4, 2018, which claims priority to Chinese Patent Application No. 201710309704.0, filed on May 4, 2017. All of the aforementioned patent applications are hereby incorporated herein by reference in their entireties.

TECHNICAL FIELD

The present invention relates to the field of network communications, and in particular, to an information sending and receiving method and a related device.

BACKGROUND

In comparison with Long Term Evolution (LTE), a higher carrier frequency such as 38 GHz or 72 GHz is used in a 5G communications system, to implement wireless communication with a larger bandwidth and a higher transmission rate. Because a carrier frequency is relatively high, a radio signal transmitted by using the carrier frequency encounters more severe fading in a spatial propagation process, and even it is difficult to detect the radio signal at a receive end. Therefore, a beamforming technology is to be used in the 5G communications system to obtain a beam with good directivity, to increase power in a transmit direction and improve a signal to interference plus noise ratio (SINR) at the receive end. To improve communication quality, the beamforming technology is also used on a user equipment (UE) side to generate analog beams in different directions for receiving and sending data. Because a base station and user equipment communicate with each other by using a relatively narrow analog beam, better communication quality can be obtained only when the analog beams for sending and receiving are aligned. Therefore, it has been determined in the 3GPP RAN1 meeting that a beam sweeping process is used in New Radio (NR) to determine a beam pair between the base station and the UE, and a plurality of beam pairs are monitored in a communication process, to improve robustness of a communication link.

Further, to extend coverage of a network device and ensure that a terminal device can quickly obtain a synchronization signal, system information, and the like required for accessing a network, the information needs to periodically broadcast in NR. In NR, a synchronization signal block (SS block) includes a primary synchronization signal (PSS), a secondary synchronization signal (SSS), and/or a new radio physical broadcast channel (NR-PBCH), and the SS block may occupy a plurality of orthogonal frequency division multiplexing (OFDM) symbols that are related to a carrier band and a subcarrier spacing. FIG. 1 is a schematic structural diagram of an SS burst set according to this application. One or more SS blocks form one synchronization signal burst SS burst, and one or more SS bursts form one synchronization signal burst set SS burst set.

However, in an actual communication process, the network device may need to configure different quantities of SS blocks in an SS burst set based on different service requirements. Therefore, how the network device effectively notifies the terminal device of a quantity of SS blocks is a problem that needs to be urgently resolved.

SUMMARY

To resolve a technical problem, embodiments of the present invention provide a method for indicating a quantity of synchronization signal blocks, a receiving method, and a related device, to resolve a problem that transmission bit overheads are relatively high when a network device in a 5G communications system notifies a terminal device of a quantity of SS blocks included in an SS burst set.

According to a first aspect, an embodiment of this application provides an information sending method, and the method may include:

sending, by a network device, first indication information to a terminal device, where the first indication information is carried by using m bits in a downlink signal, and the first indication information includes related information indicating a quantity n of synchronization signal blocks SS blocks included in a synchronization signal burst set SS burst set, where m<$\log_2 N$, N is a maximum value of a quantity of SS blocks supported in the SS burst set, both m and n are integers greater than 1, and n is less than or equal to N.

Optionally, the related information about n is an index corresponding to a value of n in a first quantity set, and the first quantity set includes a plurality of values of the quantity of SS blocks supported in the SS burst set.

Optionally, the SS burst set is corresponding to different first quantity sets on different carrier bands, and that the first quantity set includes a plurality of values of the quantity of SS blocks supported in the SS burst set includes: the first quantity set includes a plurality of values of a quantity of SS blocks supported in the SS burst set on a current carrier band.

In this embodiment of this application, value sets corresponding to the quantity n of SS blocks on different carrier bands are separately agreed upon in advance. In addition, because some of possible values are specified in a value set, and the other possible values are discarded, transmission overheads can be greatly reduced when index matching is performed to indicate the quantity n of SS blocks.

Optionally, the SS burst set is corresponding to a same first quantity set on at least two carrier bands, and that the first quantity set includes a plurality of values of the quantity of SS blocks supported in the SS burst set includes: the first quantity set includes a plurality of values of a quantity of SS blocks supported in the SS burst set on each of the at least two carrier bands.

In this embodiment of this application, a value set corresponding to the quantity n of SS blocks on a plurality of carrier bands is agreed upon in advance. In addition, because some of possible values are specified in a value set, and the other possible values are discarded, transmission overheads can be greatly reduced when index matching is performed to indicate the quantity n of SS blocks.

Optionally, the SS burst set is corresponding to different first quantity sets in different SS burst set periods, and that the first quantity set includes a plurality of values of the quantity of SS blocks supported in the SS burst set includes: the first quantity set includes a plurality of values of a quantity of SS blocks supported in the SS burst set in a current SS burst set period.

In this embodiment of this application, value sets corresponding to the quantity n of SS blocks in different SS burst set periods are separately agreed upon in advance. In addition, because some of possible values are specified in a value set, and the other possible values are discarded, transmission overheads can be greatly reduced when index matching is performed to indicate the quantity n of SS blocks.

Optionally, the SS burst set is corresponding to a same first quantity set in at least two SS burst set periods, and that the first quantity set includes a plurality of values of the quantity of SS blocks supported in the SS burst set includes: the first quantity set includes a plurality of values of a quantity of SS blocks supported in the SS burst set in each of the at least two SS burst set periods.

In this embodiment of this application, a value set corresponding to the quantity n of SS blocks in a plurality of SS burst set periods is agreed upon in advance. In addition, because some of possible values are specified in a value set, and the other possible values are discarded, transmission overheads can be greatly reduced when index matching is performed to indicate the quantity n of SS blocks.

Optionally, the method further includes: generating, by the network device, demodulation reference signal DMRS sequences of a corresponding physical broadcast channel PBCH based on different SS burst set periods; or generating, by the network device, corresponding pseudo noise PN sequences based on different SS burst set periods, and scrambling DMRSs by using the PN sequences.

Optionally, the SS burst set includes X synchronization signal bursts SS bursts, and each SS burst includes a same quantity of SS blocks; and the related information about n is a quantity A of SS blocks in a single SS burst, where both X and A are integers greater than 1; or each SS burst in the SS burst set includes Y SS blocks; and the related information about n is a quantity B of SS bursts included in the SS burst set, where both Y and B are integers greater than 1.

In this embodiment of this application, because a quantity of SS bursts in an SS burst set is explicitly specified, and it is stipulated that each SS burst includes a same quantity of SS blocks, only a specific quantity of SS blocks in each SS burst needs to be notified to the terminal device; or because a quantity of SS blocks in each SS burst is explicitly specified, and it is stipulated that each SS burst includes a same quantity of SS blocks, only a specific quantity of SS bursts needs to be notified to the terminal device, so that transmission overheads can be greatly reduced.

Optionally, the SS burst set includes X synchronization signal bursts SS bursts, and each SS burst includes a same quantity of SS blocks; and the related information about n is an index corresponding to a value of a quantity A of SS blocks in a single SS burst in a second quantity set, and the second quantity set includes a plurality of values of the quantity A of SS blocks in the single SS burst, where both X and A are integers greater than 1; or each SS burst in the SS burst set includes Y SS blocks; and the related information about n is an index corresponding to a value of a quantity B of SS bursts included in the SS burst set in a third quantity set, and the third quantity set includes a plurality of values of the quantity B of SS bursts included in the SS burst set, where both Y and B are integers greater than 1.

In this embodiment of this application, only an index of a specific quantity of SS blocks in each SS burst needs to be indicated or only an index of a specific quantity of SS bursts needs to be indicated, so that transmission overheads are further reduced.

Optionally, the downlink signal includes a first system message and first dedicated signaling; and that the first indication information is carried by using m bits in a downlink signal includes: the first indication information is carried by using Q bits in the first system message and m-Q bits in the first dedicated signaling together, where Q is an integer greater than 0, and Q is less than m.

This embodiment of this application provides a specific implementation in which the network device enables the m bits in the downlink signal to carry the first indication information.

Optionally, the first system message is a message carried on the physical broadcast channel PBCH or remaining minimum system information RMSI; and/or the first dedicated signaling is any one of radio resource control RRC signaling, Media Access Control baseband resource MAC CE signaling, downlink control information DCI signaling, and preset dedicated signaling that is used to carry the related information about n.

This embodiment of this application provides a specific implementation in which the network device enables the m bits in the downlink signal to carry the first indication information.

Optionally, the downlink signal includes a second system message, the second system message includes a plurality of types of messages, and the plurality of types of messages include at least a message carried on the physical broadcast channel PBCH and remaining minimum system information; and that the first indication information is carried by using m bits in a downlink signal includes: the first indication information is carried by using m bits in at least one of the plurality of types of messages.

This embodiment of this application provides a specific implementation in which the network device enables the m bits in the downlink signal to carry the first indication information.

Optionally, the related information about n is group indexes and intra-group indexes that are of groups to which the quantity n of SS blocks belongs, and the groups are I groups obtained after H values of the quantity of SS blocks supported in the SS burst set are classified, where both H and I are integers greater than 1, and I is less than H; and that the first indication information is carried by using m bits in a downlink system signal includes: the group indexes are carried by using Q bits in the first system message and the intra-group indexes are carried by using m-Q bits in the first dedicated signaling, where Q is an integer greater than 0.

In this embodiment of this application, a plurality of values of the quantity n of SS blocks are agreed upon in advance, the plurality of values are classified, and then the quantity n of SS blocks is indicated by matching a corresponding index. In this way, not only transmission overheads can be reduced, but also efficiency of identifying the quantity n of SS blocks by the terminal device can be improved.

According to a second aspect, an embodiment of this application provides an information receiving method, and the method may include:

receiving, by a terminal device, first indication information sent by a network device, where the first indication information is carried by using m bits in a downlink signal, and the first indication information includes related information indicating a quantity n of synchronization signal blocks SS blocks included in a synchronization signal burst set SS burst set, where m<$\log_2 N$, and N is a maximum value of a quantity of SS blocks supported in the SS burst set; and determining, by the terminal device, the quantity n of SS blocks according to the first indication information.

Optionally, the related information about n is an index corresponding to a value of n in a first quantity set, and the first quantity set includes a plurality of values of the quantity of SS blocks supported in the SS burst set; and the determining, by the terminal device, the quantity n of SS blocks according to the first indication information includes: determining, by the terminal device, the quantity n of SS blocks based on the first quantity set and the corresponding index.

Optionally, the SS burst set is corresponding to different first quantity sets on different carrier bands; and before the determining, by the terminal device, the quantity n of SS blocks according to the first indication information, the method further includes: determining, by the terminal device, a current carrier band of the SS burst set; and determining, by the terminal device, a corresponding first quantity set based on the determined carrier band.

Optionally, the SS burst set is corresponding to different first quantity sets in different SS burst set periods; and before the determining, by the terminal device, the quantity n of SS blocks according to the first indication information, the method further includes: determining, by the terminal device, a current SS burst set period of the SS burst set; and determining, by the terminal device, a corresponding first quantity set based on the determined SS burst set period.

Optionally, demodulation reference signal DMRS sequences that are of a corresponding physical broadcast channel PBCH and that are generated in different SS burst set periods are different; or DMRS sequences that are scrambled by using corresponding pseudo noise PN sequences and that are generated in different SS burst set periods are different; and the determining, by the terminal device, a current SS burst set period of the SS burst set includes: determining, by the terminal device, the current SS burst set period of the SS burst set based on the DMRS sequence or the DMRS sequence scrambled by using the PN sequence.

According to a third aspect, an embodiment of this application provides an information sending method, and the method may include:

sending, by a network device, second indication information to a terminal device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where $a+b=\log_2 N$, N is a maximum value of a quantity of SS blocks supported in the SS burst set, a, b, and n all are integers greater than 0, and n is less than or equal to N.

In this embodiment of this application, the second indication information is distributed in the downlink system message and the downlink reference signal for joint transmission, thereby reducing overheads of one of the message or the signal.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

According to a fourth aspect, an embodiment of this application provides an information receiving method, and the method may include:

receiving, by a terminal device, second indication information sent by a network device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where $a+b=\log_2 N$, N is a maximum value of a quantity of SS blocks supported in the SS burst set, a, b, and n all are integers greater than 0, and n is less than or equal to N; and determining, by the terminal device, the quantity n of SS blocks according to the second indication information.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

According to a fifth aspect, an embodiment of this application provides a network device, and the network device may include:

a communications unit, configured to send first indication information to a terminal device, where the first indication information is carried by using m bits in a downlink signal, and the first indication information includes related information indicating a quantity n of synchronization signal blocks SS blocks included in a synchronization signal burst set SS burst set, where $m<\log_2 N$, N is a maximum value of a quantity of SS blocks supported in the SS burst set, both m and n are integers greater than 1, and n is less than or equal to N.

Optionally, the related information about n is an index corresponding to a value of n in a first quantity set, and the first quantity set includes a plurality of values of the quantity of SS blocks supported in the SS burst set.

Optionally, the SS burst set is corresponding to different first quantity sets on different carrier bands, and that the first quantity set includes a plurality of values of the quantity of SS blocks supported in the SS burst set includes:

the first quantity set includes a plurality of values of a quantity of SS blocks supported in the SS burst set on a current carrier band.

Optionally, the SS burst set is corresponding to a same first quantity set on at least two carrier bands, and that the first quantity set includes a plurality of values of the quantity of SS blocks supported in the SS burst set includes:

the first quantity set includes a plurality of values of a quantity of SS blocks supported in the SS burst set on each of the at least two carrier bands.

Optionally, the SS burst set is corresponding to different first quantity sets in different SS burst set periods, and that the first quantity set includes a plurality of values of the quantity of SS blocks supported in the SS burst set includes:

the first quantity set includes a plurality of values of a quantity of SS blocks supported in the SS burst set in a current SS burst set period.

Optionally, the SS burst set is corresponding to a same first quantity set in at least two SS burst set periods, and that the first quantity set includes a plurality of values of the quantity of SS blocks supported in the SS burst set includes:

the first quantity set includes a plurality of values of a quantity of SS blocks supported in the SS burst set in each of the at least two SS burst set periods.

Optionally, the network device further includes:

a processing unit, configured to: generate demodulation reference signal DMRS sequences of a corresponding physical broadcast channel PBCH based on different SS burst set periods; or generate corresponding pseudo noise PN sequences based on different SS burst set periods, and scramble DMRSs by using the PN sequences.

Optionally, the SS burst set includes X synchronization signal bursts SS bursts, and each SS burst includes a same quantity of SS blocks; and the related information about n is a quantity A of SS blocks in a single SS burst, where both X and A are integers greater than 1; or each SS burst in the SS burst set includes Y SS blocks; and the related information about n is a quantity B of SS bursts included in the SS burst set, where both Y and B are integers greater than 1.

Optionally, the SS burst set includes X synchronization signal bursts SS bursts, and each SS burst includes a same quantity of SS blocks; and the related information about n is an index corresponding to a value of a quantity A of SS blocks in a single SS burst in a second quantity set, and the second quantity set includes a plurality of values of the quantity A of SS blocks in the single SS burst, where both X and A are integers greater than 1; or each SS burst in the SS burst set includes Y SS blocks; and the related information about n is an index corresponding to a value of a quantity B of SS bursts included in the SS burst set in a third quantity set, and the third quantity set includes a plurality of values of the quantity B of SS bursts included in the SS burst set, where both Y and B are integers greater than 1.

Optionally, the downlink signal includes a first system message and first dedicated signaling; and that the first indication information is carried by using m bits in a downlink signal includes: the first indication information is carried by using Q bits in the first system message and m-Q bits in the first dedicated signaling together, where Q is an integer greater than 0, and Q is less than m.

Optionally, the first system message is a message carried on the physical broadcast channel PBCH or remaining minimum system information RMSI; and/or the first dedicated signaling is any one of radio resource control RRC signaling, Media Access Control baseband resource MAC CE signaling, downlink control information DCI signaling, and preset dedicated signaling that is used to carry the related information about n.

Optionally, the downlink signal includes a second system message, the second system message includes a plurality of types of messages, and the plurality of types of messages include at least a message carried on the physical broadcast channel PBCH and remaining minimum system information; and that the first indication information is carried by using m bits in a downlink signal includes: the first indication information is carried by using m bits in at least one of the plurality of types of messages.

Optionally, the related information about n is group indexes and intra-group indexes that are of groups to which the quantity n of SS blocks belongs, and the groups are I groups obtained after H values of the quantity of SS blocks supported in the SS burst set are classified, where both H and I are integers greater than 1, and I is less than H; and that the first indication information is carried by using m bits in a downlink system signal includes: the group indexes are carried by using Q bits in the first system message and the intra-group indexes are carried by using m-Q bits in the first dedicated signaling, where Q is an integer greater than 0.

According to a sixth aspect, an embodiment of this application provides a terminal device, and the terminal device may include:

a communications unit, configured to receive first indication information sent by a network device, where the first indication information is carried by using m bits in a downlink signal, and the first indication information includes related information indicating a quantity n of synchronization signal blocks SS blocks included in a synchronization signal burst set SS burst set, where m<$\log_2 N$, and N is a maximum value of a quantity of SS blocks supported in the SS burst set; and a processing unit, configured to determine the quantity n of SS blocks according to the first indication information.

Optionally, the related information about n is an index corresponding to a value of n in a first quantity set, and the first quantity set includes a plurality of values of the quantity of SS blocks supported in the SS burst set.

That the processing unit is configured to determine the quantity n of SS blocks according to the first indication information is specifically:

determining the quantity n of SS blocks based on the first quantity set and the corresponding index.

Optionally, the SS burst set is corresponding to different first quantity sets on different carrier bands, and the processing unit is further configured to:

before determining the quantity n of SS blocks according to the first indication information, determine a current carrier band of the SS burst set, and determine a corresponding first quantity set based on the determined carrier band.

Optionally, the SS burst set is corresponding to different first quantity sets in different SS burst set periods, and the processing unit is further configured to:

before determining the quantity n of SS blocks according to the first indication information, determine a current SS burst set period of the SS burst set, and determine a corresponding first quantity set based on the determined SS burst set period.

Optionally, demodulation reference signal DMRS sequences that are of a corresponding physical broadcast channel PBCH and that are generated in different SS burst set periods are different; or DMRS sequences that are scrambled by using corresponding pseudo noise PN sequences and that are generated in different SS burst set periods are different. That the processing unit is configured to determine a current SS burst set period of the SS burst set is specifically: determining the current SS burst set period of the SS burst set based on the DMRS sequence or the DMRS sequence scrambled by using the PN sequence.

According to a seventh aspect, an embodiment of this application provides a network device, and the network device may include:

a communications unit, configured to send second indication information to a terminal device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=$\log_2 N$, N is a maximum value of a quantity of SS blocks supported in the SS burst set, a, b, and n all are integers greater than 0, and n is less than or equal to N.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

According to an eighth aspect, an embodiment of this application provides a network device, and the network device may include:

a communications unit, configured to receive second indication information sent by a network device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where $a+b=\log_2 N$, N is a maximum value of a quantity of SS blocks supported in the SS burst set, a, b, and n all are integers greater than 0, and n is less than or equal to N; and a processing unit, configured to determine, by the terminal device, the quantity n of SS blocks according to the second indication information.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

According to a ninth aspect, this application provides a network device, and the network device has a function of implementing the method in any one of the foregoing information sending method embodiments. The function may be implemented by hardware or may be implemented by hardware executing corresponding software. The hardware or the software includes one or more modules corresponding to the foregoing function.

According to a tenth aspect, this application provides a terminal device, and the terminal device has a function of implementing the method in any one of the foregoing information receiving method embodiments. The function may be implemented by hardware or may be implemented by hardware executing corresponding software. The hardware or the software includes one or more modules corresponding to the foregoing function.

According to an eleventh aspect, this application provides a network device. The network device includes a processor, and the processor is configured to support the network device in performing a corresponding function in the information sending method provided in the first aspect or the third aspect. The network device may further include a memory. The memory is coupled to the processor, and stores a program instruction and data that are necessary for the network device. The network device may further include a communications interface, configured to implement communication between the network device and another device or a communications network.

According to a twelfth aspect, this application provides a terminal device. The terminal device includes a processor, and the processor is configured to support the terminal device in performing a corresponding function in the control information receiving method provided in the second aspect or the fourth aspect. The terminal device may further include a memory. The memory is coupled to the processor, and stores a program instruction and data that are necessary for the terminal device. The terminal device may further include a communications interface, configured to implement communication between the terminal device and another device or a communications network.

According to a thirteenth aspect, this application provides a computer storage medium, configured to store a computer software instruction used by the network device provided in the eleventh aspect, where the computer software instruction includes a program designed to perform the foregoing aspect.

According to a fourteenth aspect, this application provides a computer storage medium, configured to store a computer software instruction used by the terminal device provided in the twelfth aspect, where the computer software instruction includes a program designed to perform the foregoing aspect.

According to a fifteenth aspect, an embodiment of this application provides a computer program, and the computer program includes an instruction. When the computer program is executed by a computer, the computer can perform the procedure of the information sending method in either the first aspect or the third aspect.

According to a sixteenth aspect, an embodiment of this application provides a computer program, and the computer program includes an instruction. When the computer program is executed by a computer, the computer can perform the procedure of the information receiving method in either the second aspect or the fourth aspect.

BRIEF DESCRIPTION OF THE DRAWINGS

To describe the technical solutions in the embodiments of this application or in the background more clearly, the following describes the accompanying drawings required for describing the embodiments of this application or the background.

DETAILED DESCRIPTION OF ILLUSTRATIVE EMBODIMENTS

Figure 1:
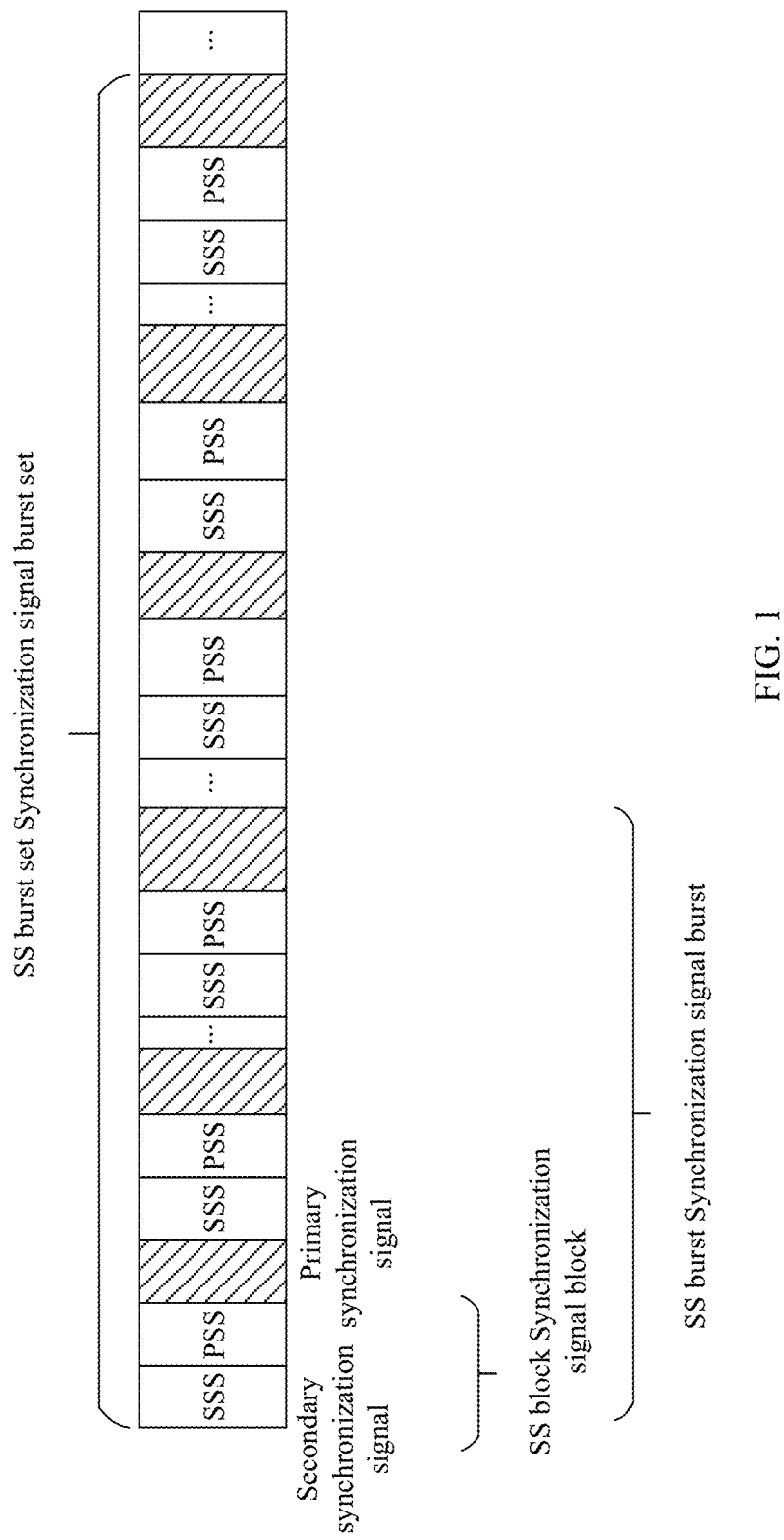
FIG. 1 is a schematic structural diagram of an SS burst set according to this application.

The following describes the embodiments of this application with reference to the accompanying drawings in the embodiments of this application.

In the specification, the claims, and the accompanying drawings of this application, the terms "first", "second", "third", "fourth", and the like are intended to distinguish between different objects but do not indicate a particular order. In addition, the terms "including" and "having" and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to the embodiments may be included in at least one embodiment of this application. The phrase in various locations in this specification does not necessarily refer to a same embodiment, and is not an independent or alternate embodiment exclusive of another embodiment. Persons skilled in the art understand, in explicit and implicit manners, that an embodiment described in this specification may be combined with another embodiment.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and components may be located on one computer and/or distributed between two or more computers. In addition, these components may be executed from various computer readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the embodiments of the present invention may be applied to a next-generation communications system such as a 5G radio access (NR) system, which is referred to as a 5GNR system for short.

Usually, a conventional communications system supports a limited quantity of connections, and is easy to implement. However, with evolution of a communications technology, in addition to conventional communication, a mobile communications system supports, for example, device-to-device (D2D) communication, machine-to-machine (M2M) communication, machine type communication (MTC), and vehicle to vehicle (V2V) communication.

The embodiments are described with respect to a sending device and a receiving device in the embodiments of the present invention.

A terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STA) in a wireless local area network (WLAN), or may be a cellular phone, a cordless phone, a Session Initiation Protocol (SIP) phone, a wireless local loop (WLL) station, a personal digital assistant (PDA) device, a handheld device or a computing device having a wireless communication function, another processing device connected to a wireless modem, an in-vehicle device, a wearable device, a terminal device in a next-generation communications system such as a 5th Generation (5G) network, a terminal device in a future evolved public land mobile network (PLMN), or the like.

As an example instead of a limitation, in the embodiments of the present invention, the terminal device may be alternatively a wearable device. The wearable device may also be referred to as a wearable intelligent device, and is a general term of wearable devices, such as glasses, gloves, watches, clothes, and shoes, that are developed by applying a wearable technology to intelligent designs of daily wearing. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, for example, various smart bracelets or smart jewelry for vital sign monitoring.

In addition, the embodiments are described with respect to a network device in the embodiments of the present invention. The network device may be a device for communicating with a mobile device or the like. The network device may be an access point (AP) in a WLAN, a relay station or an access point, an in-vehicle device, a wearable device, a network device (g Node B (gNB or gNodeB)) in a future 5G network, a network device in a future evolved PLMN network, or the like.

In addition, in the embodiments of the present invention, the network device provides a service for a cell. The terminal device communicates with the network device by using a transmission resource (for example, a frequency domain resource or a spectrum resource) used in the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. The small cells have features such as small coverage and low transmit power, and are adapted to provide high-rate data transmission services.

In addition, a plurality of cells may work in a same frequency on a carrier in a 5G system. In some special scenarios, it may be considered that the carrier and the cell are equivalent in concept. For example, in a carrier aggregation (CA) scenario, when a secondary component carrier is configured for the terminal device, both a carrier index of the secondary component carrier and a cell identifier (cell ID) of a secondary serving cell that works on the secondary component carrier are carried. In this case, it may be considered that the carrier and the cell are equivalent in concept. For example, access to a carrier by the terminal device is equivalent to access to a cell by the terminal device.

The method and the related device provided in the embodiments of the present invention may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, such as the Linux operating system, the UNIX operating system, the Android operating system, the iOS operating system, or the Windows operating system. The application layer includes applications such as a browser, a contact list, word processing software, and instant communication software. In addition, in the embodiments of the present invention, a specific structure of an entity for performing a control information transmission method is not specially limited in the embodiments of the present invention, provided that the entity can run a program recording code of the control information transmission method in the embodiments of the present invention, to perform communication based on the control information transmission method in the embodiments of the present invention. For example, a wireless communication method in the embodiments of the present invention may be performed by a terminal device or a network device, or a functional module that is in a terminal device or a network device and that can invoke a program and execute the program.

In addition, each aspect or feature of the embodiments of the present invention may be implemented as a method, an apparatus, or a product that uses standard programming and/or engineering technologies. The term "product" used in this application covers a computer program that can be accessed from any computer readable component, carrier, or medium. For example, computer readable medium may include but is not limited to: a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read only memory (EPROM), a card, a stick, or a key drive). In addition, various storage media described in this specification may indicate one or more devices and/or other machine readable media that are used to store information. The term "machine readable media" may include but is not limited to a radio channel, and various other media that can store, contain, and/or carry an instruction and/or data.

First, a to-be-resolved technical problem and an application scenario in this application are proposed. In an actual communication process, a network device may need to configure different quantities of SS blocks in an SS burst set based on different service requirements. Therefore, to improve efficiency of communication between the network device and a terminal device, the network device usually needs to notify the terminal device of a quantity of SS blocks in real time.

Currently, in the 3GPP RAN1 #88bis meeting, an agreement that a quantity of actually used SS blocks is sent by using a physical broadcast channel (PBCH), remaining minimum system information (RMSI), other system information (other SI), dedicated signaling (dedicated signaling), and the like is reached. However, no public document has disclosed related technical details. It may be considered that in an existing solution, the quantity of SS blocks is directly transmitted in one of the foregoing manners.

In addition, currently, NR has agreed that a maximum of 64 SS blocks are supported in one SS burst set on a band higher than 6 GHz but lower than 52.6 GHz, and a maximum of eight SS blocks are supported on a band lower than 6 GHz. Obviously, a maximum quantity of supported SS blocks on the high band is different from that on the low band, and therefore quantities of bits for representing the information on the high band and the low band are also different, which are respectively 6 bits and 3 bits. Therefore, the prior art has the following problem: If 6 bits are directly placed on a PBCH for the high band, system overheads are greatly increased. If different quantities of bits are used to represent quantities of SS blocks on the high band and the low band and the bits are placed on a PBCH, a size of the PBCH varies on the high band and the low band, and different rate matching needs to be performed.

However, because a quantity of SS blocks is usually relatively large and needs to change based on a service requirement, relatively high transmission bit overheads may be generated, and communication efficiency is reduced. Therefore, a technical problem to be resolved in this application is how to enable the network device to notify, by using relatively low overheads in an effective information notification method, the terminal device of a quantity n of SS blocks included in an SS burst set.

Based on the above, to facilitate understanding of the embodiments of this application, the following first describes a communications system architecture on which the embodiments of this application are based.

Figure 2:
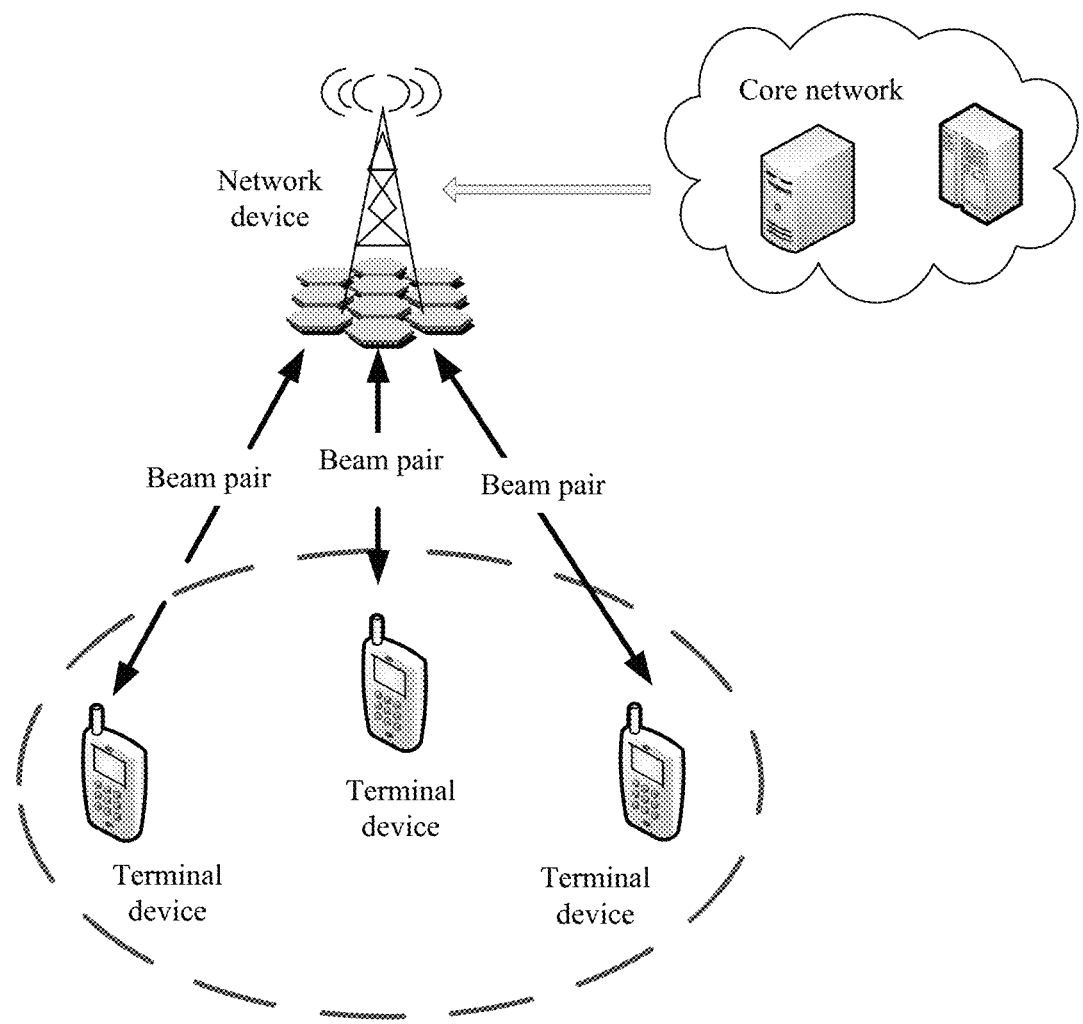
FIG. 2 is a diagram of a communications network architecture according to an embodiment of this application.

FIG. 2 is a diagram of a communications system architecture according to an embodiment of this application. The communications system architecture includes a core network, a network device, and a terminal device. As an example instead of a limitation, the core network provides a related service for an entire communication process, the network device indicates a quantity of SS blocks to an accessed terminal device, and the terminal device performs SS block sweeping by using the quantity of SS blocks that is indicated by the network device.

The terminal device may be a user-side device in the communications system. The terminal device can use a beamforming technology to generate analog beams in different directions for receiving and sending data, and can determine a beam pair between the terminal device and the network device by using a beam sweeping process.

The network device may be a network-side network element in a 5G communications system, for example, a gNB in the 5G communications system. Specifically, the network device can determine a beam pair between the network device and the terminal device by using a beam sweeping process, and monitors a plurality of beam pairs in a communication process, to improve robustness of a communication link. To extend coverage of the network device and ensure that the terminal device can quickly obtain a synchronization signal, system information, and the like required for accessing a network, the network device can further periodically broadcast the information. It may be understood that the network device and the terminal device communicate with each other by using a relatively narrow analog beam, better communication quality can be obtained only when the analog beams for sending and receiving are aligned. For more details, refer to descriptions in the following embodiments.

It may be understood that the communications system architecture in FIG. 2 is merely an example implementation in the embodiments of this application. A communications system architecture in the embodiments of this application includes but is not limited to the foregoing communications system architecture.

With reference to the information receiving and sending method embodiment provided in this application, the following specifically analyzes and resolves the technical problem proposed in this application.

Figure 3:
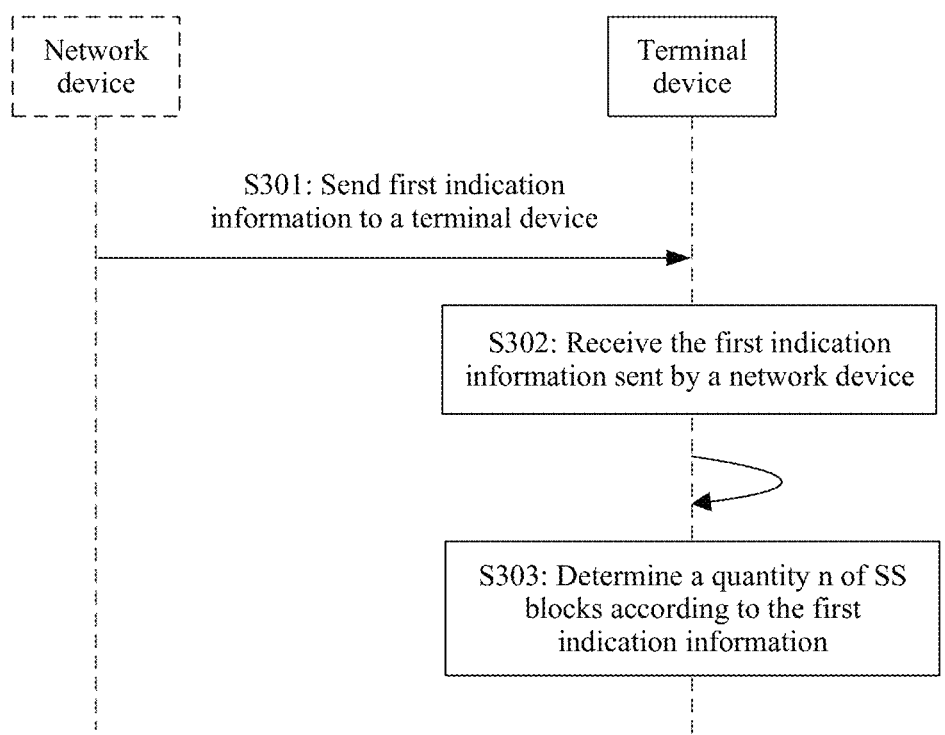
FIG. 3 is a schematic flowchart of an information sending and receiving method according to an embodiment of this application.

FIG. 3 is a schematic flowchart of an information sending and receiving method according to an embodiment of this application. The method may be applied to the communications system in FIG. 2. The following describes the method from a perspective of interaction between a network device and a terminal device with reference to FIG. 3, and the method may include the following steps S301 to S303.

Step S301. A network device sends first indication information to a terminal device.

Specifically, the first indication information is carried by using m bits in a downlink signal, and the first indication information includes related information indicating a quantity n of synchronization signal blocks SS blocks included in a synchronization signal burst set SS burst set, where $m < \log_2 N$, N is a maximum value of a quantity of SS blocks supported in the SS burst set, both m and n are integers greater than 1, and n is less than or equal to N.

If the quantity n of SS blocks included in the SS burst set is directly sent on the downlink signal, $\log_2 N$ bits need to be occupied, and consequently transmission overheads are relatively high. In addition, when the quantity n of SS blocks included in the SS burst set is relatively small, the quantity n still needs to be transmitted by using the $\log_2 N$ bits corresponding to a case in which n is the maximum value N, and consequently more resources are inevitably wasted. In this application, the network device does not directly send, to the terminal device, the quantity n of SS blocks included in the SS burst set, but sends the related information about the quantity n such as index information or information simplified according to a protocol stipulation, so that transmission overheads can be reduced.

Step S302: The terminal device receives the first indication information sent by the network device.

Specifically, the first indication information is carried by using the m bits in the downlink signal, and the first indication information includes the related information indicating the quantity n of synchronization signal blocks SS blocks included in the synchronization signal burst set SS burst set, where $m < \log_2 N$, and N is the maximum value of the quantity of SS blocks supported in the SS burst set.

The terminal device receives the first indication information on the corresponding downlink signal according to the protocol stipulation, that is, receives and obtains the related information indicating the quantity n of SS blocks included in the SS burst set.

Step S303: The terminal device determines the quantity n of SS blocks according to the first indication information.

Specifically, the terminal device calculates or determines the quantity n of actually included SS blocks according to the first indication information and the protocol stipulation and based on the related information that is about the quantity n of SS blocks included in the SS burst set and that is included in the first indication information, to perform sweeping based on the quantity n.

Based on a general idea of the foregoing embodiment corresponding to FIG. 3, the following specifically describes, with reference to example implementations, how the network device sends the first indication information to the terminal device, and how the network device indicates, to the terminal device by using the related information about n, the quantity of SS blocks included in the SS burst set, thereby reducing transmission overheads.

First, specific implementations are classified into two types because the related information about n included in the first indication information varies.

Type 1: The related information about n is an index corresponding to a value of n in a first quantity set, and the first quantity set includes a plurality of values of the quantity of SS blocks supported in the SS burst set. In other words, the related information about n mainly includes an index corresponding to a specific value of n. This type of implementation may specifically include the following Manner 1 to Manner 4:

Manner 1:

In Manner 1, the SS burst set is corresponding to different first quantity sets on different carrier bands, and the first quantity set includes a plurality of values of a quantity of SS blocks supported in the SS burst set on a current carrier band. That is, a protocol pre-stipulates sets of quantities n of SS blocks separately supported in the SS burst set on different carrier bands, and stipulates indexes separately corresponding to elements (values of n) in the sets. Then, an index corresponding to a value of n is sent to the terminal device by using the m bits in the downlink signal (for example, separately or jointly using a system message and signaling). A specific implementation may be as follows:

1. The protocol stipulates maximum quantities of supported SS blocks on different carrier bands. For example, when a carrier band is lower than 6 GHz, a maximum value of a quantity of supported SS blocks is N=8; when a carrier band is higher than 6 GHz but lower than 52.6 GHz, a maximum value of a quantity of supported SS blocks is N=64. In this case, $\log_2 N = 3$ for the carrier band lower than 6 GHz, and $\log_2 N = 6$ for the carrier band higher than 6 GHz but lower than 52.6 GHz.

2. The protocol stipulates that different carrier bands are corresponding to different first quantity sets, and the first quantity set includes a plurality of values of a quantity of SS blocks supported in the SS burst set on a current corresponding carrier band. For example, if a carrier band is lower than 6 GHz, a corresponding first quantity set is {1, 2, 4, 8}, and it indicates that only 1, 2, 4, or 8 SS blocks can be supported in the SS burst set on the low carrier band; if a carrier band is higher than 6 GHz but lower than 52.6 GHz, a corresponding first quantity set is {8, 16, 32, 64}, and it indicates that only 8, 16, 32, or 64 SS blocks can be supported in the SS burst set on the high carrier band. It may be understood that in this implementation, a value of m is related to a quantity of values of a quantity n of supported SS blocks on a carrier band, that is, a quantity of elements in a first quantity set corresponding to a low carrier band may be the same as or may be different from a quantity of elements in a first quantity set corresponding to a high carrier band. If the two quantities are the same, m is equal on different carrier bands, and in this case, the network device sends the first indication information by using a same information format on different carrier bands. If the two quantities are different, m is not equal on different carrier bands, and in this case, the network device sends the first indication information by using different information formats. It may be understood that the terminal device also correspondingly receives and parses the first indication information by using a same information format or different information formats.

3. The protocol further stipulates indexes corresponding to all elements in a first quantity set. For example, if a carrier band is lower than 6 GHz, a first quantity set is {1, 2, 4, 8}, and indexes corresponding to the first quantity set are 0, 1, 2, and 3 (decimal), namely, 00, 01, 10, and 11 (binary); if a carrier band is higher than 6 GHz but lower than 52.6 GHz, a first quantity set is {8, 16, 32, 64}, and indexes corresponding to the first quantity set are 0, 1, 2, and 3 (decimal), namely, 00, 01, 10, and 11 (binary). For example, details are shown in the following Table 1:

TABLE 1

| Carrier band | Index | Quantity of SS blocks |
|---|---|---|
| Lower than 6 GHz | 00 | 1 |
| | 01 | 2 |
| | 10 | 4 |
| | 11 | 8 |
| Higher than 6 GHz but lower than 52.6 GHz | 00 | 8 |
| | 01 | 16 |
| | 10 | 32 |
| | 11 | 64 |
| ... | ... | ... |

4. The network device sends the first indication information to the terminal device by using the m bits in the downlink signal, where the first indication information is an index corresponding to a value of the quantity n of SS blocks included in the SS burst set in the corresponding first quantity set. For example, if the current carrier band corresponding to the SS burst set is lower than 6 GHz, the corresponding first quantity set is {1, 2, 4, 8}. When n=4 SS blocks actually need to be sent, the first indication information is an index 10, and in this case, the first indication information may be carried by using m=2 bits, and it is obvious that m<$\log_2 N$. If the current carrier band corresponding to the SS burst set is higher than 6 GHz but lower than 52.6 GHz, the corresponding first quantity set is {8, 16, 32, 64}. When n=32 SS blocks actually need to be sent, the first indication information is an index 10, and in this case, the first indication information may also be carried by using m=2 bits.

5. After receiving the first indication information, the terminal device first determines, according to the protocol stipulation, the current carrier band corresponding to the SS burst set, and determines the corresponding first quantity set based on the carrier band. Finally, the terminal device determines the quantity n of SS blocks according to the first indication information, namely, the index corresponding to the value of n in the corresponding first quantity set. For example, after receiving the first indication information, namely, an index 01, the terminal device first determines that the current carrier band is lower than 6 GHz, determines that the first quantity set corresponding to the carrier band is {1, 2, 4, 8}, and finally determines n=4 based on the index "01". Similarly, if the terminal device determines that the current carrier band is higher than 6 GHz but lower than 52.6 GHz, the quantity n of SS blocks corresponding to the index 01 is 16.

It may be further understood that if only one specified quantity of SS blocks is supported for different carrier bands, the quantity only needs to be stipulated in the protocol, and does not need to be explicitly notified.

In Manner 1, value sets corresponding to the quantity n of SS blocks on different carrier bands are separately agreed upon in advance. In addition, because some of possible values are specified in a value set, and the other possible values are discarded, transmission overheads can be greatly reduced when index matching is performed to indicate the quantity n of SS blocks.

Manner 2:

In Manner 2, the SS burst set is corresponding to a same first quantity set on at least two carrier bands, and the first quantity set includes a plurality of values of a quantity of SS blocks supported in the SS burst set on each of the at least two carrier bands. That is, a protocol pre-stipulates a set of quantities n of SS blocks supported in the SS burst set on a plurality of carrier bands, and stipulates indexes separately corresponding to elements (values of n) in the set. Then, an index corresponding to a value of n is sent to the terminal device by using the m bits in the downlink signal (for example, separately or jointly using a system message and signaling). A specific implementation may be as follows:

1. The protocol stipulates maximum quantities of supported SS blocks on different carrier bands. For example, when a carrier band is lower than 6 GHz, a maximum value of a quantity of supported SS blocks is N=8; when a carrier band is higher than 6 GHz but lower than 52.6 GHz, a maximum value of a quantity of supported SS blocks is N=64. In this case, $\log_2 N$=3 for the carrier band lower than 6 GHz, and $\log_2 N$=6 for the carrier band higher than 6 GHz but lower than 52.6 GHz.

2. The protocol stipulates all possible quantities of supported SS blocks on different carrier bands. For example, when a carrier band is lower than 6 GHz, quantities of supported SS blocks are only {1, 2, 4, 8}; when a carrier band is higher than 6 GHz but lower than 52.6 GHz, quantities of supported SS blocks are only {8, 16, 32, 64}. In the foregoing two cases, the protocol stipulates that the first quantity set is {1, 2, 4, 8, 16, 32, 64}, that is, values of the quantity n of supported SS blocks on different carrier bands are included in a same set.

3. The network device sends the first indication information to the terminal device by using the m bits in the downlink signal, where the first indication information is an index corresponding to a value of the quantity n of SS blocks included in the SS burst set in the first quantity set. For example, regardless of a current carrier band, all carrier bands are corresponding to a same first quantity set {1, 2, 4, 8, 16, 32, 64}, and indexes corresponding to the first quantity set are 0, 1, 2, 3, 4, 5, and 6 (decimal), namely, 000, 001, 010, 011, 100, 101, and 110 (binary, 3 bits). In this case, m=3 bits are required for transmitting the first indication information. For example, details are shown in the following Table 2:

TABLE 2

| Carrier band | Index | Quantity of SS blocks |
|---|---|---|
| Lower than 6 GHz and higher than 6 GHz but lower than 52.6 GHz | 000 | 1 |
| | 001 | 2 |
| | 010 | 4 |
| ... | 011 | 8 |
| | 100 | 16 |
| | 101 | 32 |
| | 110 | 64 |
| | ... | ... |

After receiving the first indication information, the terminal device first directly searches the specified first quantity set for the corresponding quantity n based on an index of n in the first indication information according to the protocol stipulation, instead of focusing on the current carrier band of the SS burst set.

It may be understood that compared with Manner 1, m is larger in Manner 2. Because a quantity of elements in the set is obtained after combination, and is obviously greater than that before the combination, transmission overheads are slightly higher. However, because a plurality of carrier bands share a same first quantity set, the terminal device does not need to determine the current carrier band. In addition, m is corresponding to a same value, and the network device sends the first indication information by using a same information format.

It may be further understood that if only one specified quantity of SS blocks is supported for different carrier bands, the quantity only needs to be stipulated in the protocol, and does not need to be explicitly notified.

In Manner 2, a value set corresponding to the quantity n of SS blocks on a plurality of carrier bands is agreed upon in advance. In addition, because some of possible values are specified in a value set, and the other possible values are discarded, transmission overheads can be greatly reduced when index matching is performed to indicate the quantity n of SS blocks.

Manner 3:

In Manner 3, the SS burst set is corresponding to different first quantity sets in different SS burst set periods, and the first quantity set includes a plurality of values of a quantity of SS blocks supported in the SS burst set in a current SS burst set period. That is, a protocol pre-stipulates sets of quantities n of SS blocks separately supported in the SS burst set in different SS burst set periods, and stipulates indexes separately corresponding to elements (values of n) in the sets. Then, an index corresponding to a value of n is sent to the terminal device by using the m bits in the downlink signal (for example, separately or jointly using a system message and signaling). A specific implementation may be as follows:

1. The protocol stipulates maximum quantities of supported SS blocks in different SS burst set periods. For example, if an SS burst set period is 20 ms, a maximum value of a quantity of supported SS blocks is N=8; if an SS burst set period is 80 ms, a maximum value of a quantity of supported SS blocks is N=64. In this case, $\log_2 N=3$ for the period 20 ms, and $\log_2 N=6$ for the period 80 ms.

2. The protocol stipulates that different SS burst set periods are corresponding to different first quantity sets, and the first quantity set includes a plurality of values of a quantity of SS blocks supported in the SS burst set in a current SS burst set period. For example, if an SS burst set period is 20 ms, a corresponding first quantity set is {1, 2, 4, 8}, and it indicates that only 1, 2, 4, or 8 SS blocks can be supported in the SS burst set in this shorter SS burst set period; if an SS burst set period is 80 ms, a corresponding first quantity set is {8, 16, 32, 64}, and it indicates that only 8, 16, 32, or 64 SS blocks can be supported in the SS burst set in this longer SS burst set period. It may be understood that in this implementation, a value of m is related to a quantity of values of the quantity n of supported SS blocks in an SS burst set period, that is, a quantity of elements in a first quantity set corresponding to a shorter SS burst set period may be the same as or may be different from a quantity of elements in a first quantity set corresponding to a longer SS burst set period. If the two quantities are the same, m is equal in different SS burst set periods, and in this case, the terminal device receives and parses the first indication information by using same bits in different SS burst set periods. If the two quantities are different, m is not equal in different SS burst set periods, and the network device needs to send the first indication information by using different information formats.

3. The protocol further stipulates indexes corresponding to all elements in a first quantity set. For example, if an SS burst set period is 20 ms, a first quantity set is {1, 2, 4, 8}, and indexes corresponding to the first quantity set are 0, 1, 2, and 3 (decimal), namely, 00, 01, 10, and 11 (binary); if an SS burst set period is 80 ms, a first quantity set is {8, 16, 32, 64}, and indexes corresponding to the first quantity set are 0, 1, 2, and 3 (decimal), namely, 00, 01, 10, and 11 (binary). For example, details are shown in the following Table 3:

TABLE 3

| SS burst set period | Index | Quantity of SS blocks |
|---|---|---|
| 20 ms | 00 | 1 |
|  | 01 | 2 |
|  | 10 | 4 |
|  | 11 | 8 |
| 80 ms | 00 | 8 |
|  | 01 | 16 |
|  | 10 | 32 |
|  | 11 | 64 |
| ... | ... | ... |

4. The network device sends the first indication information to the terminal device by using the m bits in the downlink signal, where the first indication information is an index corresponding to a value of the quantity n of SS blocks included in the SS burst set in the corresponding first quantity set. For example, if the current SS burst set period is 20 ms, the corresponding first quantity set is {1, 2, 4, 8}. When n=4 SS blocks actually need to be sent, the first indication information is an index 10, and in this case, the first indication information may be carried by using m=2 bits, and it is obvious that m<$\log_2 N$. If the current SS burst set period corresponding to the SS burst set is 80 ms, the corresponding first quantity set is {8, 16, 32, 64}. When n=32 SS blocks actually need to be sent, the first indication information is an index 10, and in this case, the first indication information may be carried by using m=2 bits.

5. After receiving the first indication information, the terminal device first determines, according to the protocol stipulation, the current SS burst set period corresponding to the SS burst set, and determines the corresponding first quantity set based on the SS burst set period. Finally, the terminal device determines the quantity n of SS blocks according to the first indication information, namely, the index corresponding to the value of n in the corresponding first quantity set. For example, after receiving the first indication information, namely, an index 01, the terminal device first determines that the current SS burst set period is 20 ms, determines that the first quantity set corresponding to the SS burst set period is {1, 2, 4, 8}, and finally determines n=4 based on the index "01". Similarly, if the terminal device determines that the current SS burst set period is 80 ms, the quantity n of SS blocks corresponding to the index 01 is 16.

It may be further understood that if only one specified quantity of SS blocks is supported for different SS burst set periods, the quantity only needs to be stipulated in the protocol, and does not need to be explicitly notified.

In Manner 3, value sets corresponding to the quantity n of SS blocks in different SS burst set periods are separately agreed upon in advance. In addition, because some of possible values are specified in a value set, and the other possible values are discarded, transmission overheads can be greatly reduced when index matching is performed to indicate the quantity n of SS blocks.

Manner 4:

In Manner 4, the SS burst set is corresponding to a same first quantity set in at least two SS burst set periods, and the first quantity set includes a plurality of values of a quantity of SS blocks supported in the SS burst set in each of the at least two SS burst set periods. That is, a protocol pre-stipulates a set of quantities n of SS blocks supported in the SS burst set in a plurality of SS burst set periods, and stipulates indexes separately corresponding to elements (values of n) in the set. Then, an index corresponding to a value of n is sent to the terminal device by using the m bits in the downlink signal (for example, separately or jointly using a system message and signaling). A specific implementation may be as follows:

1. The protocol stipulates maximum quantities of supported SS blocks in different SS burst set periods. For example, if an SS burst set period is 20 ms, a maximum value of a quantity of supported SS blocks is N=8; if an SS burst set period is 80 ms, a maximum value of a quantity of supported SS blocks is N=64. In this case, $\log_2 N=3$ for the period 20 ms, and $\log_2 N=6$ for the period 80 ms.

2. The protocol stipulates all possible quantities of supported SS blocks in different SS burst set periods. For example, when an SS burst set period is 20 ms, quantities of supported SS blocks are only {(1, 2, 4, 8}; when an SS burst set period is 80 ms, quantities of supported SS blocks are only {8, 16, 32, 64}. In the foregoing two cases, the protocol stipulates that the first quantity set is {1, 2, 4, 8, 16, 32, 64}, that is, values of the quantity n of supported SS blocks in different SS burst set periods are included in a same set.

3. The network device sends the first indication information to the terminal device by using the m bits in the downlink signal, where the first indication information is an index corresponding to a value of the quantity n of SS blocks included in the SS burst set in the first quantity set. For example, regardless of a current SS burst set period, all SS burst set periods are corresponding to a same first quantity set {1, 2, 4, 8, 16, 32, 64}, and indexes corresponding to the first quantity set are 0, 1, 2, 3, 4, 5, and 6 (decimal), namely, 000, 001, 010, 011, 100, 101, and 110 (binary). In this case, m=3 bits are required for transmitting the first indication information. For example, details are shown in the following Table 4:

TABLE 4

| SS burst set period | Index | Quantity of SS blocks |
|---|---|---|
| 20 ms and 80 ms | 000 | 1 |
| ... | 001 | 2 |
| | 010 | 4 |
| | 011 | 8 |
| | 100 | 16 |
| | 101 | 32 |
| | 110 | 64 |
| | ... | ... |

After receiving the first indication information, the terminal device first directly searches the specified first quantity set for the corresponding quantity n based on an index of n in the first indication information according to the protocol stipulation, instead of focusing on the current SS burst set period of the SS burst set.

It may be understood that if only one specified quantity of SS blocks is supported for different SS burst set periods, the quantity only needs to be stipulated in the protocol, and does not need to be explicitly notified.

It may be further understood that compared with Manner 3, m is larger in Manner 4. Because a quantity of elements in the set is obtained after combination, and is obviously greater than that before the combination, transmission overheads are slightly higher. However, because a plurality of SS burst set periods share a same first quantity set, the terminal device does not need to determine the current SS burst set period. In addition, m is corresponding to a same value, and the network device sends the first indication information by using a same information format.

It should be noted that in the foregoing Manner 3 and Manner 4, the terminal device may obtain and determine the current SS burst set period by using system information and a broadcast message. This application provides a method for implicitly sending SS burst set period information by using a PBCH. The following two possible implementations are included:

In a possible implementation, the network device generates demodulation reference signal DMRS sequences of a corresponding physical broadcast channel PBCH based on different SS burst set periods, and the terminal device determines the current SS burst set period of the SS burst set based on the DMRS sequence. In another possible implementation, the network device generates corresponding pseudo noise PN sequences based on different SS burst set periods, and scrambles DMRSs by using the PN sequences, and the terminal device determines the current SS burst set period of the SS burst set based on the DMRS sequence scrambled by using the PN. A specific implementation may be as follows:

1. The network device generates a DMRS sequence of a corresponding PBCH based on an SS burst set period, or generates a PN sequence based on an SS burst set period, and scrambles a DMRS by using the PN sequence.

2. The protocol pre-stipulates that different SS burst sets are associated with different sequences. The sequences may be used as DMRSs of the PBCH or used for scrambling DMRSs. For example, in NR, SS burst set periods may be 5 ms, 10 ms, 20 ms, 40 ms, 80 ms, and 160 ms, that is, six orthogonal or pseudo-orthogonal sequences are required. If more periods are to be supported, more sequences are required.

Optionally, in addition to the foregoing manner, SS burst set period information may be included by using different cyclic redundancy check (CRC) masks of the PBCH, different redundancy versions of the PBCH, different shift versions of the PBCH, or the like.

3. The terminal device receives an SS block, and obtains an SS burst set period through correlation detection. The terminal device equalizes a DMRS by using a channel estimated based on an SSS, generates corresponding DMRS sequences based on different SS burst set periods, and then performs correlation detection on the corresponding DMRS sequences and the equalized DMRS sequence. It is assumed that an SS burst set period with a highest correlation is an actual SS burst set period.

The method for performing correlation detection based on a DMRS sequence can be faster and more accurate than a method for performing correlation detection by using a CRC mask. After an SS burst set period is obtained, combined demodulation of PBCHs between SS blocks corresponding to different SS burst sets can be implemented to obtain better demodulation performance.

In Manner 4, a value set corresponding to the quantity n of SS blocks in a plurality of SS burst set periods is agreed upon in advance. In addition, because some of possible values are specified in a value set, and the other possible values are discarded, transmission overheads can be greatly reduced when index matching is performed to indicate the quantity n of SS blocks.

Type 2: The related information about n includes a parameter or an index that is used to calculate the quantity n of SS blocks according to a protocol stipulation. This type of implementation may specifically include the following Manner 5 to Manner 9:

Manner 5:

In Manner 5, the SS burst set includes X synchronization signal bursts SS bursts, and each SS burst includes a same quantity of SS blocks; and the related information about n is a quantity A of SS blocks in a single SS burst, where both X and A are integers greater than 1. That is, a protocol pre-stipulates a specific quantity of SS bursts included in an SS burst set, and stipulates that each SS burst includes a same quantity of SS blocks. Then, the quantity A of SS blocks in the SS burst is sent to the terminal device by using the m bits in the downlink signal (for example, separately or jointly by using a system message and signaling). A specific implementation may be as follows:

1. The protocol stipulates that each SS burst set includes X SS bursts, and stipulates that each SS burst includes a same quantity of SS blocks. For example, if the protocol stipulates X=8, each SS burst set includes eight SS bursts, and each SS burst can include only a same quantity of SS blocks.

2. The network device sends the first indication information to the terminal device, where the related information about n included in the first indication information is the quantity A of SS blocks in the single SS burst. For example, if A=8, it indicates that each SS burst includes eight SS blocks, that is, the network device actually transmits A×X=64 SS blocks at this time. In this case, because a binary number corresponding to A=8 (decimal) that needs to be transmitted is 111 (a binary number 000 is used to indicate that a quantity of SS blocks is 1), m=3. Assuming that the maximum value of n is N=64, $\log_2 N=6$, and it is obvious that $m<\log_2 N$.

3. After receiving the first indication information, the terminal device performs calculation based on the quantity A of SS blocks in each SS burst in the first indication information and the fact pre-stipulated in the protocol that an SS burst set includes X SS bursts, that is, a quantity of SS blocks included in a current SS burst set is obtained by multiplying A by X. For example, if X=8 and A=8, through calculation, the terminal device learns that the network device actually transmits A×X=64 SS blocks.

In Manner 5, because a quantity of SS bursts in an SS burst set is explicitly specified, and it is stipulated that each SS burst includes a same quantity of SS blocks, only a specific quantity of SS blocks in each SS burst needs to be notified to the terminal device, so that transmission overheads can be greatly reduced.

Manner 6:

In Manner 6, the SS burst set includes X synchronization signal bursts SS bursts, and each SS burst includes a same quantity of SS blocks; and the related information about n is an index corresponding to a value of a quantity A of SS blocks in a single SS burst in a second quantity set, and the second quantity set includes a plurality of values of the quantity A of SS blocks in the single SS burst, where both X and A are integers greater than 1. That is, a protocol pre-stipulates a specific quantity of SS bursts included in an SS burst set, and stipulates that each SS burst includes a same quantity of SS blocks. Then, the index corresponding to the value of the quantity A of SS blocks in the SS burst in the predefined second quantity set is sent to the terminal device by using the m bits in the downlink signal (for example, separately or jointly using a system message and signaling).

A difference between this implementation and Manner 5 lies in that in Manner 5, the network device sends a value (binary) of A to the terminal device, and in this implementation, the network device sends an index corresponding to a value of A in a predefined value set to the terminal device. Therefore, after receiving the index, the terminal device needs to perform matching based on the index in the predefined second quantity set to obtain a specific value of A. For a specific implementation, refer to the foregoing Manner 5. Details are not described herein again.

In Manner 6, a beneficial effect corresponding to Manner 5 is reserved, and transmission overheads are further reduced when only an index of a specific quantity of SS blocks in each SS burst needs to be indicated.

Manner 7:

In Manner 7, each SS burst in the SS burst set includes Y SS blocks; and the related information about n is a quantity B of SS bursts included in the SS burst set, where both Y and B are integers greater than 1. That is, a protocol pre-stipulates that each SS burst includes a same quantity of SS blocks, and specifically stipulates a quantity of SS blocks included in each SS burst. Then, the quantity B of SS bursts in the SS burst set is sent to the terminal device by using the m bits in the downlink signal (for example, separately or jointly by using a system message and signaling). A specific implementation may be as follows:

1. The protocol stipulates that each SS burst in the SS burst set includes Y SS blocks, that is, each SS burst includes a same quantity of SS blocks and the quantity is Y. For example, if the protocol stipulates Y=4, each SS burst includes four SS blocks.

2. The network device sends the first indication information to the terminal device, where the related information about n included in the first indication information is the quantity B of SS bursts in the SS burst set. For example, if B=8, it indicates that the SS burst set includes a total of eight SS bursts, and the network device actually transmits B×Y=32 SS blocks at this time. In this case, because a binary number corresponding to A=8 (decimal) that needs to be transmitted is 111 (a binary number 000 is used to indicate that a quantity of SS blocks is 1), m=3. Assuming that the maximum value of n is N=64, $\log_2 N=6$, and it is obvious that $m<\log_2 N$.

3. After receiving the first indication information, the terminal device performs calculation based on the quantity B of SS bursts in the first indication information and the fact pre-stipulated in the protocol that each SS burst includes Y SS blocks, that is, a quantity of SS blocks included in a current SS burst set is obtained by multiplying B by Y. For example, if Y=4 and B=8, through calculation, the terminal device learns that the network device actually transmits B×Y=32 SS blocks.

In Manner 7, because a quantity of SS blocks in each SS burst is explicitly specified, and it is stipulated that each SS burst includes a same quantity of SS blocks, only a specific quantity of SS bursts needs to be notified to the terminal device, so that transmission overheads can be greatly reduced.

Manner 8:

In Manner 8, each SS burst in the SS burst set includes Y SS blocks; and the related information about n is an index corresponding to a value of a quantity B of SS bursts included in the SS burst set in a third quantity set, and the third quantity set includes a plurality of values of the quantity B of SS bursts included in the SS burst set, where both Y and B are integers greater than 1. That is, a protocol pre-stipulates a specific quantity of SS blocks included in an SS burst, and stipulates that each SS burst includes a same quantity of SS blocks. Then, the index corresponding to the value of the quantity B of SS bursts in the SS burst set in the predefined third quantity set is sent to the terminal device by using the m bits in the downlink signal (for example, separately or jointly using a system message and signaling).

A difference between this implementation and Manner 7 lies in that in Manner 7, the network device sends a value (binary) of B to the terminal device, and in this implementation, the network device sends an index corresponding to a value of B in a predefined value set to the terminal device. Therefore, after receiving the index, the terminal device needs to perform matching based on the index in the predefined third quantity set to obtain a specific value of B. For a specific implementation, refer to the foregoing Manner 7. Details are not described herein again.

In Manner 8, a beneficial effect corresponding to Manner 7 is reserved, and transmission overheads are further reduced when only an index of a specific quantity of SS bursts needs to be indicated.

Manner 9:

In Manner 9, the related information about n is group indexes and intra-group indexes that are of groups to which the quantity n of SS blocks belongs, and the groups are I groups obtained after H values of the quantity of SS blocks supported in the SS burst set are classified, where both H and I are integers greater than 1, and I is less than H; and the group indexes are carried by using Q bits in the first system message and the intra-group indexes are carried by using m-Q bits in the first dedicated signaling, where Q is an integer greater than 0. That is, a protocol pre-stipulates a set of quantities n of supported SS blocks in an SS burst set. Elements (values of n) in the set are classified into one group, then index matching is performed on the group, and index matching is performed on elements in the group. Then, the group indexes and the intra-group indexes corresponding to the values of n are sent to the terminal device by using the m bits in the downlink signal (for example, separately or jointly by using a system message and signaling). A specific implementation may be as follows:

1. Assuming that quantities of SS blocks supported by the protocol are {1, 2, 4, 8, 16, 24, 32, 64}, the quantities may be classified into four groups (1, 2), (4, 8), (16, 24), and (32, 64), and indexing is performed by using 2 bits. The network device roughly indicates, by using the Q bits in the first system message, a group to which a current quantity of SS blocks belongs. Before a specific quantity of SS blocks is obtained, it may be assumed that a relatively small value in a group is the quantity of SS blocks.

2. For a terminal device in an RRC_Connected mode, the network device notifies a specific quantity of SS blocks by using the m-Q bits in the first dedicated signaling. For a terminal device in an idle mode, based on a network access requirement, an NR-SS is detected to determine whether there is an additional SS block.

It may be understood that in the foregoing nine manners of this application, because the quantity n of SS blocks is indicated by using an index of the quantity n of SS blocks, or the quantity n of SS blocks is calculated by using a related parameter of the quantity n of SS blocks, a quantity of transmission bits is small. Therefore, when the quantity of SS blocks is being indicated, transmission overheads can be reduced, and communication efficiency is improved.

In Manner 9, a plurality of values of the quantity n of SS blocks are agreed upon in advance, the plurality of values are classified, and then the quantity n of SS blocks is indicated by matching a corresponding index. In this way, not only transmission overheads can be reduced, but also efficiency of identifying the quantity n of SS blocks by the terminal device can be improved.

In the foregoing nine manners, classification is mainly performed based on different content specifically included in the related information about n. The following specifically describes how the network device specifically enables the m bits in the downlink signal to carry the first indication information.

With reference to any one of the foregoing Manner 1 to Manner 9, the downlink signal includes a first system message and first dedicated signaling; and the first indication information is carried by using Q bits in the first system message and m-Q bits in the first dedicated signaling together, where Q is an integer greater than 0, and Q is less than m. That is, a protocol stipulates that the m bits in the downlink signal are divided into two parts for transmission, to further reduce overheads of a system message or signaling. In a possible implementation, the first system message is a message carried on the physical broadcast channel PBCH or remaining minimum system information RMSI; and/or the first dedicated signaling is any one of radio resource control RRC signaling, Media Access Control baseband resource MAC CE signaling, downlink control information DCI signaling, and preset dedicated signaling that is used to carry the related information about n.

With reference to any one of the foregoing Manner 1 to Manner 9, the downlink signal includes a second system message, the second system message includes a plurality of types of messages, and the plurality of types of messages include at least a message carried on the physical broadcast channel PBCH and remaining minimum system information; and the first indication information is carried by using m bits in at least one of the plurality of types of messages. That is, the m bits of the first indication information may be carried by using any one of the plurality of types of system messages, or may be carried by using two or more system messages. For example, all the m bits are carried in the message carried on the PBCH, or some of the m bits are carried in the message carried on the PBCH and some of the m bits are carried in another system message. This is not specifically limited in this application.

It should be noted that the first system message may be the same as or different from the second system message, and this is not specifically limited in this application. The first system message and the second system message may further include a paging message and a system information block (SIB).

This application further resolves a technical problem that excessive system message overheads are caused by transmitting indication information by using a system message. With reference to the information receiving and sending method embodiment provided in this application, the following specifically analyzes and resolves the foregoing technical problem proposed in this application.

Figure 4:
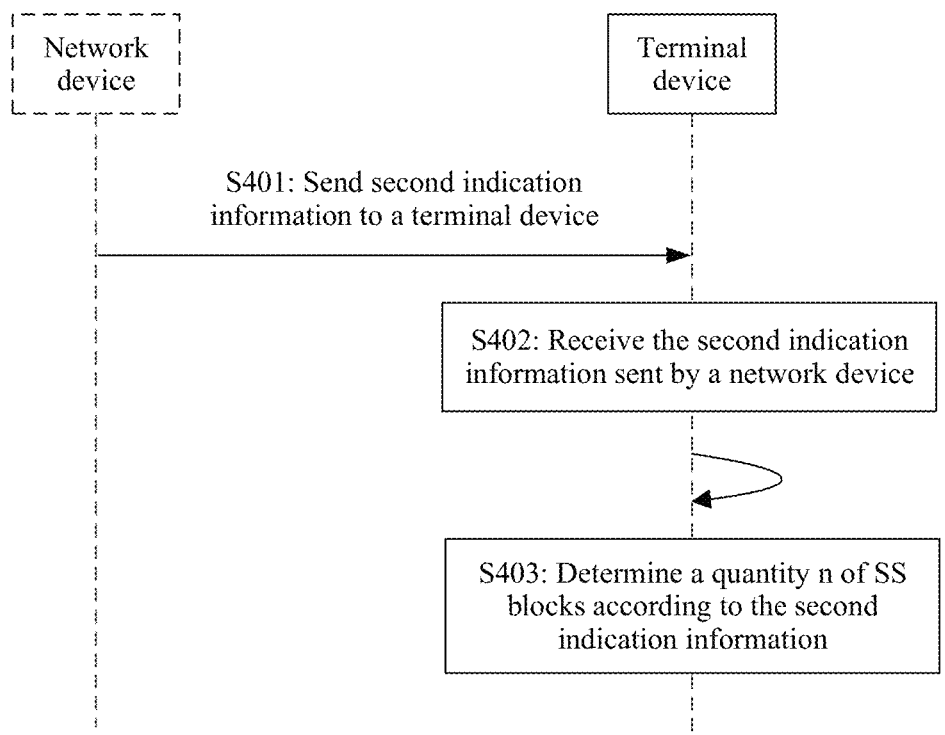
FIG. 4 is a schematic flowchart of another information sending and receiving method according to an embodiment of this application.

FIG. 4 is a schematic flowchart of another information sending and receiving method according to an embodiment of this application. The method may be applied to the communications system in FIG. 2. The following describes the method from a perspective of interaction between a network device and a terminal device with reference to FIG. 4, and the method may include the following steps S401 to S403.

Step S401: A network device sends second indication information to a terminal device.

Specifically, the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=log$_2$N, N is a maximum value of a quantity of SS blocks supported in the SS burst set, a, b, and n all are integers greater than 0, and n is less than or equal to N. The second indication information in this embodiment is different from the first indication information in the foregoing embodiment corresponding to FIG. 3, because the first indication information corresponding to FIG. 3 is related information about the quantity n of SS blocks, but the second indication information in this embodiment is the quantity n of SS blocks (namely, a binary number of n) instead of the related information. In addition, in this embodiment, the second indication information is distributed in the downlink system message and the downlink reference signal for joint transmission, thereby reducing overheads of one of the message or the signal.

In a possible implementation, the downlink system message is a message carried on a physical broadcast channel PBCH, and the downlink reference signal is a demodulation reference signal DMRS sequence of the PBCH; and the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence. That is, some of bits of the quantity n of SS blocks are explicitly sent in the message carried on the PBCH, and the other bits are implicitly sent in the demodulation reference signal DMRS sequence of the PBCH. Details may be as follows:

1. The network device directly places Q bits of information about the quantity n of SS blocks on the PBCH, where remaining bit information is presented in an implicit manner.

It is assumed that the quantity n of SS blocks needs to be represented by using m bits. A value of m may be related to a quantity of actually sent SS blocks in the SS burst set, or may be related to maximum quantities of supported SS blocks on different carrier bands. For example, when a carrier band is lower than 6 GHz, m is 3, and when a carrier band is higher than 6 GHz but lower than 52.6 GHz, m is 6. In this case, to uniformly design a PBCH on the high band and a PBCH on the low band, a value of Q is 3, that is, 3 bits of information about the quantity n of SS blocks are placed on the PBCH, and m-3 bits of information are presented in an implicit manner. For another example, Q bits are explicitly carried on the PBCH, and m-Q bits are carried in an implicit manner. The network device may further distinguish, by using 1 bit of information, whether the implicitly sent bit information needs to be solved. The 1 bit of information may be directly associated with a carrier band, and is not explicitly sent, that is, the M-Q bits of information do not need to be solved for the low band but need to be solved for the high band; or the 1 bit of information is implicitly sent together with the M-Q bits of information, in other words, M-Q+1 bits of information are implicitly sent; or the 1 bit of information is explicitly sent on the PBCH. Other manners are not excluded.

There may be various implicit manners. For example, (1) the remaining bit information is distinguished by using different CRC masks of the PBCH, different redundancy versions of the PBCH, different cyclic shift versions of the PBCH, or the like; (2) DMRSs of the PBCH are scrambled by using different designed sequences or different DMRS sequences are used to distinguish the implicitly carried bit information. If 3 bits of information need to be distinguished, eight different versions in the corresponding manner are required. In this case, for the low band, all 3 bits are included in the PBCH, that is, 000 is represented in an implicit manner.

2. The terminal device receives the PBCH and detects the PBCH in a corresponding manner, to obtain information about the quantity n of SS blocks.

This implementation can reduce resource overheads compared with a manner in which all 6 bits are directly placed on the PBCH, and can reduce complexity of blind detection or detection compared with a manner in which all information bits are represented by blindly detecting the PBCH or detecting a DMRS of the PBCH.

Step S402: The terminal device receives the second indication information sent by the network device.

Specifically, the second indication information is carried by using the a bits in the downlink system message and the b bits in the downlink reference signal, and the second indication information is used to indicate the quantity n of synchronization signal blocks SS blocks included in the synchronization signal burst set SS burst set, where a+b=log$_2$N, N is the maximum value of the quantity of SS blocks supported in the SS burst set, a, b, and n all are integers greater than 0, and n is less than or equal to N.

Step S403: The terminal device determines the quantity n of SS blocks according to the second indication information.

In this embodiment of this application, the second indication information is distributed in the downlink system message and the downlink reference signal for joint transmission, thereby reducing overheads of one of the message or the signal.

This application further provides other implementations of indicating the quantity n of SS blocks or the related information about n, and the following five implementations are mainly included:

Implementation 1: A quantity of SS blocks is distributed in a plurality of system messages or a plurality of pieces of signaling for joint transmission. In this embodiment, a manner of combining a PBCH with RMSI is used as an example. Specific steps are as follows:

1. The network device represents the quantity n of SS blocks by using a binary number of m bits, where $2^m$ is greater than or equal to a maximum quantity of SS blocks supported in the SS burst set in NR or a maximum quantity of supported SS blocks on the carrier band or in the SS burst set period, Q bits in the binary number are sent on the PBCH, and remaining m-Q bits are sent in the RMSI.

2. The terminal device obtains the quantity of SS blocks by receiving the PBCH and the RMSI.

In this process, if a protocol stipulates that the Q bits can represent all cases of the quantity of SS blocks in low-frequency communication, it means that remaining information about the quantity of SS blocks needs to be obtained from the RMSI only in high-frequency communication. If the protocol does not specify whether the Q bits have the foregoing capability, the information about the quantity of SS blocks can be obtained only by receiving the PBCH and the RMSI information during communication. In addition, 1 bit of information may be added to the PBCH to indicate whether the RMSI needs to be additionally received to obtain all information about the quantity of SS blocks. In this case, if only a relatively small quantity of SS blocks are actually used, the terminal device can obtain the quantity of SS blocks as soon as possible by using the 1 bit of identification information.

In Implementation 1, the quantity of SS blocks is distributed in a plurality of system messages or a plurality of pieces of signaling for joint transmission, thereby reducing transmission overheads of a system message or signaling.

Implementation 2: On a carrier band or in an SS burst set period, a protocol stipulates that a maximum quantity of SS blocks that can be supported is N, and stipulates a corresponding frame structure. If the quantity n of actually configured SS blocks is less than N, and SS blocks discontinuously appear in the SS burst set, a location of each activated SS block needs to be notified. Details are as follows:

1. The network device may generate a sequence based on configuration of an SS block in a current SS burst set and an active or inactive state of the SS block. If an SS block in the sequence is activated, a location corresponding to the sequence is set to 1; otherwise, the corresponding location is set to 0. The sequence may also be sent in a manner similar to the manners in Embodiment 1 and Embodiment 2 in which the PBCH and the RMSI are separately or jointly used. In addition, if several different activation modes are stipulated in the protocol, for example, an SS block with an odd number is valid and an SS block at an interval of X is valid, a corresponding mode needs to be notified, thereby reducing signaling overheads.

2. The terminal device obtains the sequence or the corresponding mode by using a broadcast message or a system message, and therefore may infer the quantity of SS blocks according to the protocol stipulation.

In Implementation 2, an activated SS block can be flexibly indicated. The terminal device may skip a non-activated SS block based on the frame structure defined in the protocol and the obtained sequence. A disadvantage of Implementation 2 is that a relatively large quantity of bits may need to be used. For example, 64 SS blocks require a maximum of 64 bits. Overheads can be properly reduced by predefining some modes.

Implementation 3: The terminal device obtains, through blind detection, a quantity of bits that are used to indicate a quantity of actually transmitted SS blocks, and further obtains information about the corresponding bits in the corresponding information, to obtain the quantity of SS blocks. Details are as follows:

1. The information about the quantity of SS blocks may be transmitted by separately or jointly using a system message and signaling. A protocol stipulates that a quantity of some or all of bits in the quantity (binary) of SS blocks is associated with a decoding manner of transmission information in a specific manner. For example, different CRC masks of the PBCH, different redundancy versions of the PBCH, or different cyclic shift versions of the PBCH are used to indicate different bit quantities.

2. The terminal device performs blind detection on the corresponding system information or signaling, that is, performs verification by using different CRC masks or performs decoding by using different redundancy versions, different cyclic shift versions, or the like, to obtain the quantity of some or all of bits in the corresponding quantity of SS blocks, and obtain the information about the corresponding quantity. Further, information about a quantity of other remaining bits is obtained, to finally obtain the quantity of SS blocks.

In Implementation 3, a quantity of bits of an SS block time index (SS block time index) may also be associated with a decoding manner of the PBCH. The terminal device may learn of a specific data bit width of the SS block time index by blindly detecting the PBCH, to solve the SS block time index. In this way, when the quantity of SS blocks in the SS burst set is relatively small, few data bits can be used to represent the SS block time index without explicit signaling overheads.

Implementation 4: The terminal device obtains a quantity of bits of an SS block time index by detecting a DMRS sequence of the PBCH. Details are as follows:

1. A protocol stipulates that quantities of bits of different SS block time indexes are associated with different new sequences, for example, a tertiary SS (TSS) sequence. The network device scrambles the DMRS of the PBCH by using a corresponding new sequence, or sends a new sequence as the DMRS of the PBCH. Because a quantity of bits of an SS block time index is much less than the quantity of SS blocks, few new sequences are required.

2. The terminal device receives the PBCH, performs channel equalization on the obtained DMRS sequence, and then performs correlation detection on the DMRS sequence obtained after the channel equalization and DMRS sequences scrambled by using different assumed new sequences or performs correlation detection on the DMRS sequence obtained after the channel equalization and different assumed new sequences, to obtain used new sequences and the corresponding quantity of bits representing the SS block time index.

The terminal device needs to perform such blind detection only when initially accessing a network or re-accessing a network. For a connected user, if the quantity of bits of the SS block time index changes, the quantity of bits of the SS block time index may be notified in advance by using dedicated signaling or through broadcasting.

In addition, the quantity of bits of the SS block time index may also be used by the terminal device to perform feedback, thereby reducing overheads.

The terminal device may obtain, by using the quantity of bits of the SS block time index, a maximum quantity of supported SS blocks in current configuration.

In Implementation 4, the terminal device can obtain, by using the quantity of bits of the SS block time index, the maximum quantity of SS blocks supported in the SS burst set in the current configuration.

Implementation 5: A part of bit information of an SS block time index is explicitly set on the PBCH, and the other part of bit information is sent in an implicit manner. Details are as follows:

1. The network device directly places Q bits of information about the SS block time index on the PBCH, where remaining bit information is presented in an implicit manner.

It is assumed that the SS block time index needs to be represented by using M bits. A value of M may be related to a quantity of actually sent SS blocks in the SS burst set, or may be related to maximum quantities of supported SS blocks on different carrier bands. For example, when a carrier band is lower than 6 GHz, M is 3, and when a carrier band is higher than 6 GHz but lower than 52.6 GHz, M is 6. In this case, to uniformly design a PBCH on the high band and a PBCH on the low band, a value of Q is 3, that is, 3 bits of information about the SS block time index are placed on the PBCH, and M-3 bits of information are presented in an implicit manner. For another example, Q bits are explicitly carried on the PBCH, and M-Q bits are carried in an implicit manner. The network device may further distinguish, by using 1 bit of information, whether the implicitly sent bit information needs to be solved. The 1 bit of information may be directly associated with a carrier band, and is not explicitly sent, that is, the M-Q bits of information do not need to be solved for the low band but need to be solved for the high band; or the 1 bit of information is implicitly sent together with the M-Q bits of information, in other words, M-Q+1 bits of information are implicitly sent; or the 1 bit of information is explicitly sent on the PBCH. Other manners are not excluded. In addition, if all information about the quantity of SS blocks is carried on the PBCH, the terminal device may further infer, by using the quantity of SS blocks, whether the implicitly sent information has actual significance.

There may be various implicit manners. For example, (1) the remaining bit information is distinguished by using different CRC masks of the PBCH, different redundancy versions of the PBCH, different cyclic shift versions of the PBCH, or the like; (2) DMRSs of the PBCH are scrambled by using different designed sequences or different DMRS sequences are used to distinguish the implicitly carried bit information. If 3 bits of information needs to be distinguished, eight different versions in the corresponding manner are required. In this case, for the low band, all 3 bits are included in the PBCH, that is, 000 is represented in an implicit manner.

2. The terminal device receives the PBCH and detects the PBCH in a corresponding manner, to obtain information about the SS block time index.

Implementation 5 can reduce resource overheads compared with a manner in which all 6 bits are directly placed on the PBCH, and can reduce complexity of blind detection or detection compared with a manner in which all information bits are represented by blindly detecting the PBCH or detecting a DMRS of the PBCH.

The foregoing describes the method in the embodiments of this application in detail, and the following provides a related apparatus in the embodiments of this application.

Figure 5:
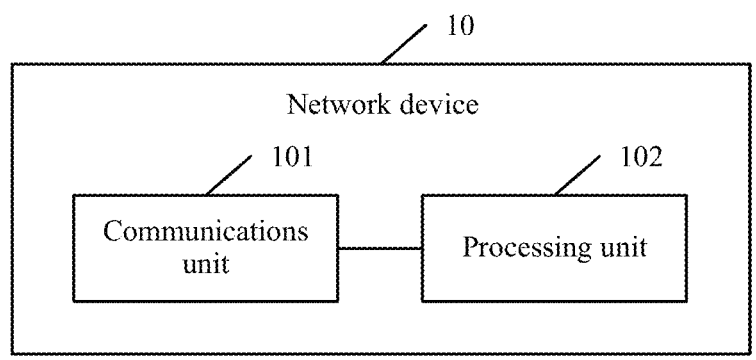
FIG. 5 is a schematic structural diagram of a network device according to an embodiment of this application.

FIG. 5 is a schematic structural diagram of a network device according to an embodiment of this application. The network device 10 may include a communications unit 101 and a processing unit 102. Detailed descriptions of each unit are as follows:

The communications unit 101 is configured to send first indication information to a terminal device, where the first indication information is carried by using m bits in a downlink signal, and the first indication information includes related information indicating a quantity n of synchronization signal blocks SS blocks included in a synchronization signal burst set SS burst set, where $m < \log_2 N$, N is a maximum value of a quantity of SS blocks supported in the SS burst set, both m and n are integers greater than 1, and n is less than or equal to N.

Optionally, the related information about n is an index corresponding to a value of n in a first quantity set, and the first quantity set includes a plurality of values of the quantity of SS blocks supported in the SS burst set.

Optionally, the SS burst set is corresponding to different first quantity sets on different carrier bands, and that the first quantity set includes a plurality of values of the quantity of SS blocks supported in the SS burst set includes:

the first quantity set includes a plurality of values of a quantity of SS blocks supported in the SS burst set on a current carrier band.

Optionally, the SS burst set is corresponding to a same first quantity set on at least two carrier bands, and that the first quantity set includes a plurality of values of the quantity of SS blocks supported in the SS burst set includes:

the first quantity set includes a plurality of values of a quantity of SS blocks supported in the SS burst set on each of the at least two carrier bands.

Optionally, the SS burst set is corresponding to different first quantity sets in different SS burst set periods, and that the first quantity set includes a plurality of values of the quantity of SS blocks supported in the SS burst set includes:

the first quantity set includes a plurality of values of a quantity of SS blocks supported in the SS burst set in a current SS burst set period.

Optionally, the SS burst set is corresponding to a same first quantity set in at least two SS burst set periods, and that the first quantity set includes a plurality of values of the quantity of SS blocks supported in the SS burst set includes:

the first quantity set includes a plurality of values of a quantity of SS blocks supported in the SS burst set in each of the at least two SS burst set periods.

Optionally, the network device 10 further includes:

a processing unit 102, configured to: generate demodulation reference signal DMRS sequences of a corresponding physical broadcast channel PBCH based on different SS burst set periods; or generate corresponding pseudo noise PN sequences based on different SS burst set periods, and scramble DMRSs by using the PN sequences.

Optionally, the SS burst set includes X synchronization signal bursts SS bursts, and each SS burst includes a same quantity of SS blocks; and the related information about n is a quantity A of SS blocks in a single SS burst, where both X and A are integers greater than 1; or each SS burst in the SS burst set includes Y SS blocks; and the related information about n is a quantity B of SS bursts included in the SS burst set, where both Y and B are integers greater than 1.

Optionally, the SS burst set includes X synchronization signal bursts SS bursts, and each SS burst includes a same quantity of SS blocks; and the related information about n is an index corresponding to a value of a quantity A of SS blocks in a single SS burst in a second quantity set, and the second quantity set includes a plurality of values of the quantity A of SS blocks in the single SS burst, where both X and A are integers greater than 1; or each SS burst in the SS burst set includes Y SS blocks; and the related information about n is an index corresponding to a value of a quantity B of SS bursts included in the SS burst set in a third quantity set, and the third quantity set includes a plurality of values of the quantity B of SS bursts included in the SS burst set, where both Y and B are integers greater than 1.

Optionally, the downlink signal includes a first system message and first dedicated signaling; and that the first indication information is carried by using m bits in a downlink signal includes: the first indication information is carried by using Q bits in the first system message and m-Q bits in the first dedicated signaling together, where Q is an integer greater than 0, and Q is less than m.

Optionally, the first system message is a message carried on the physical broadcast channel PBCH or remaining minimum system information RMSI; and/or the first dedicated signaling is any one of radio resource control RRC signaling, Media Access Control baseband resource MAC CE signaling, downlink control information DCI signaling, and preset dedicated signaling that is used to carry the related information about n.

Optionally, the downlink signal includes a second system message, the second system message includes a plurality of types of messages, and the plurality of types of messages include at least a message carried on the physical broadcast channel PBCH and remaining minimum system information; and that the first indication information is carried by using m bits in a downlink signal includes: the first indication information is carried by using m bits in at least one of the plurality of types of messages.

Optionally, the related information about n is group indexes and intra-group indexes that are of groups to which the quantity n of SS blocks belongs, and the groups are I groups obtained after H values of the quantity of SS blocks supported in the SS burst set are classified, where both H and I are integers greater than 1, and I is less than H; and that the first indication information is carried by using m bits in a downlink system signal includes: the group indexes are carried by using Q bits in the first system message and the intra-group indexes are carried by using m-Q bits in the first dedicated signaling, where Q is an integer greater than 0.

It should be noted that for functions of the functional units in the network device 10 described in this embodiment of this application, refer to the related descriptions of the foregoing method embodiment in FIG. 1 to FIG. 4. Details are not described herein again.

Figure 6:
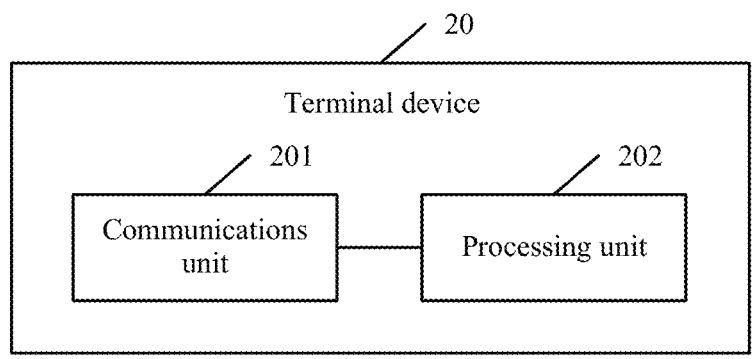
FIG. 6 is a schematic structural diagram of a terminal device according to an embodiment of this application.

FIG. 6 is a schematic structural diagram of a terminal device according to an embodiment of this application. The terminal device 20 may include a communications unit 201 and a processing unit 202. Detailed descriptions of each unit are as follows:

The communications unit 201 is configured to receive first indication information sent by a network device, where the first indication information is carried by using m bits in a downlink signal, and the first indication information includes related information indicating a quantity n of synchronization signal blocks SS blocks included in a synchronization signal burst set SS burst set, where m<$\log_2$N, and N is a maximum value of a quantity of SS blocks supported in the SS burst set.

The processing unit 202 is configured to determine the quantity n of SS blocks according to the first indication information.

Optionally, the related information about n is an index corresponding to a value of n in a first quantity set, and the first quantity set includes a plurality of values of the quantity of SS blocks supported in the SS burst set.

That the processing unit 202 is configured to determine the quantity n of SS blocks according to the first indication information is specifically:

determining the quantity n of SS blocks based on the first quantity set and the corresponding index.

Optionally, the SS burst set is corresponding to different first quantity sets on different carrier bands, and the processing unit is further configured to:

before determining the quantity n of SS blocks according to the first indication information, determine a current carrier band of the SS burst set, and determine a corresponding first quantity set based on the determined carrier band.

Optionally, the SS burst set is corresponding to different first quantity sets in different SS burst set periods, and the processing unit is further configured to:

before determining the quantity n of SS blocks according to the first indication information, determine a current SS burst set period of the SS burst set, and determine a corresponding first quantity set based on the determined SS burst set period.

Optionally, demodulation reference signal DMRS sequences that are of a corresponding physical broadcast channel PBCH and that are generated in different SS burst set periods are different; or DMRS sequences that are scrambled by using corresponding pseudo noise PN sequences and that are generated in different SS burst set periods are different. That the processing unit 202 is configured to determine a current SS burst set period of the SS burst set is specifically: determining the current SS burst set period of the SS burst set based on the DMRS sequence or the DMRS sequence scrambled by using the PN sequence.

It should be noted that for functions of the functional units in the terminal device 20 described in this embodiment of this application, refer to the related descriptions of the foregoing method embodiment in FIG. 1 to FIG. 4. Details are not described herein again.

Figure 7:
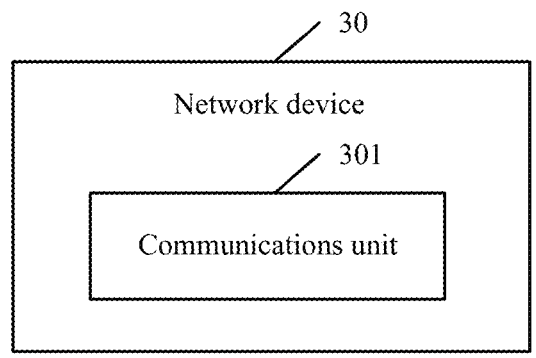
FIG. 7 is a schematic structural diagram of another network device according to an embodiment of this application.

FIG. 7 is a schematic structural diagram of another network device according to an embodiment of this application. The network device 30 may include a communications unit 301. Detailed descriptions of each unit are as follows:

The communications unit 301 is configured to send second indication information to a terminal device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=$\log_2$N, N is a maximum value of a quantity of SS blocks supported in the SS burst set, a, b, and n all are integers greater than 0, and n is less than or equal to N.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

It should be noted that for functions of the functional units in the network device 30 described in this embodiment of this application, refer to the related descriptions of the foregoing method embodiment in FIG. 1 to FIG. 4. Details are not described herein again.

Figure 8:
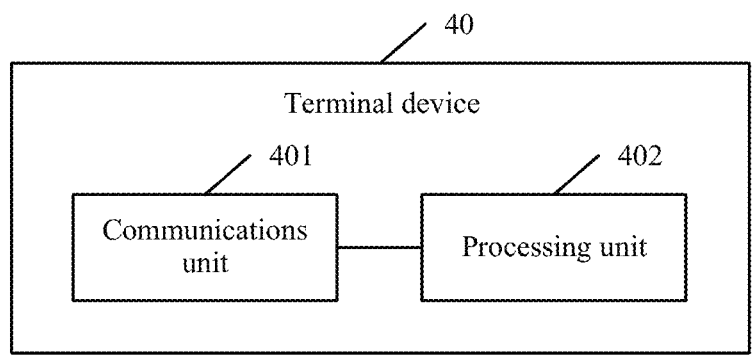
FIG. 8 is a schematic structural diagram of another terminal device according to an embodiment of this application.

FIG. 8 is a schematic structural diagram of another terminal device according to an embodiment of this application. The network device may include a communications unit 401 and a processing unit 402. Detailed descriptions of each unit are as follows:

The communications unit 401 is configured to receive second indication information sent by a network device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=$\log_2$N, N is a maximum value of a quantity of SS blocks supported in the SS burst set, a, b, and n all are integers greater than 0, and n is less than or equal to N.

The processing unit 402 is configured to determine, by the terminal device, the quantity n of SS blocks according to the second indication information.

Optionally, the downlink system message is a message carried on a physical broadcast channel PBCH, and the downlink reference signal is a demodulation reference signal DMRS sequence of the PBCH; and that the second indication information is carried by using a bits in a downlink system message and b bits associated with a downlink reference signal includes: the second indication information is carried by using a bits in the message carried on the PBCH and b bits associated with the DMRS sequence, where the b bits associated with the DMRS sequence include bit information used to generate the DMRS sequence or bit information used to generate a PN sequence for scrambling the DMRS sequence.

It should be noted that for functions of the functional units in the terminal device 40 described in this embodiment of this application, refer to the related descriptions of the foregoing method embodiment in FIG. 1 to FIG. 4. Details are not described herein again.

Figure 9:
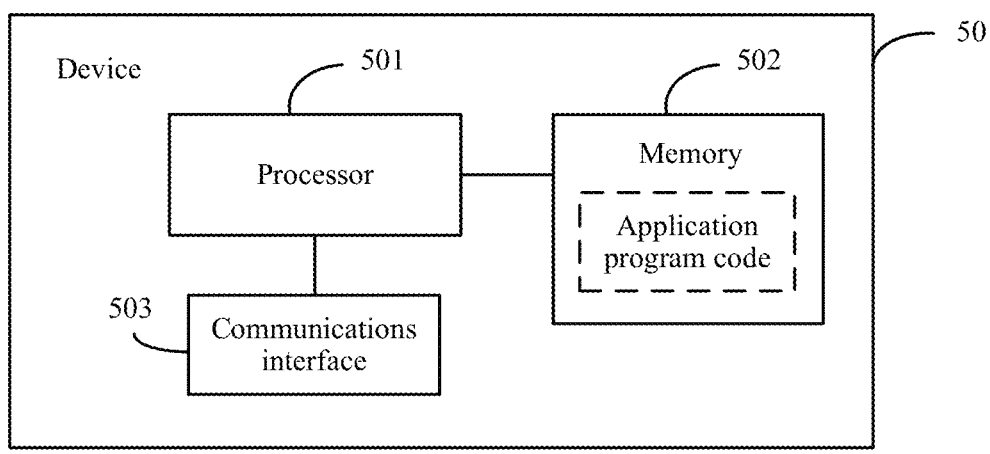
FIG. 9 is a schematic structural diagram of a device according to an embodiment of this application.

FIG. 9 is a schematic structural diagram of a device according to an embodiment of this application. The network device 10, the terminal device 20, the network device 30, and the terminal device 4o each may be implemented by using a structure shown in FIG. 9. The device 50 includes at least one processor 501, at least one memory 502, and at least one communications interface 503. In addition, the device may further include general components such as an antenna, and details are not described herein.

The processor 501 may be a general-purpose central processing unit (CPU), a microprocessor, an application-specific integrated circuit (ASIC), or one or more integrated circuits for controlling execution of the foregoing solution program.

The communications interface 503 is configured to communicate with another device or a communications network, such as the Ethernet, a radio access network (RAN), or a wireless local area network (WLAN).

The memory 502 may be a read-only memory (ROM), another type of static storage device that can store static information and an instruction, a random access memory (RAM), or another type of dynamic storage device that can store information and an instruction; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. This does not constitute a limitation herein. The memory may exist independently and is connected to the processor through a bus. The memory may also be integrated with the processor.

The memory 502 is configured to store application program code for executing the foregoing solution, and the processor 501 controls the execution. The processor 501 is configured to execute the application program code stored in the memory 1202.

When the device shown in FIG. 9 is the network device 10, the code stored in the memory 502 may perform the foregoing information sending method, for example, sending first indication information to a terminal device, where the first indication information is carried by using m bits in a downlink signal, and the first indication information includes related information indicating a quantity n of synchronization signal blocks SS blocks included in a synchronization signal burst set SS burst set, where m<$\log_2 N$, N is a maximum value of a quantity of SS blocks supported in the SS burst set, both m and n are integers greater than 1, and n is less than or equal to N.

When the device shown in FIG. 9 is the terminal device, the code stored in the memory 502 may perform the foregoing visible light-based communication method performed by a coordinator, for example, receiving first indication information sent by a network device, where the first indication information is carried by using m bits in a downlink signal, and the first indication information includes related information indicating a quantity n of synchronization signal blocks SS blocks included in a synchronization signal burst set SS burst set, where m<$\log_2 N$, and N is a maximum value of a quantity of SS blocks supported in the SS burst set; and determining the quantity n of SS blocks according to the first indication information.

When the device shown in FIG. 9 is the network device 30, the code stored in the memory 502 may perform the foregoing information sending method, for example, sending second indication information to a terminal device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=$\log_2 N$, N is a maximum value of a quantity of SS blocks supported in the SS burst set, a, b, and n all are integers greater than 0, and n is less than or equal to N.

When the device shown in FIG. 9 is the network device 30, the code stored in the memory 502 may perform the foregoing information sending method, for example, receiving second indication information sent by a network device, where the second indication information is carried by using a bits in a downlink system message and b bits associated with a downlink reference signal, and the second indication information is used to indicate a quantity n of synchronization signal blocks SS blocks included in a synchronization signal burst set SS burst set, where a+b=$\log_2 N$, N is a maximum value of a quantity of SS blocks supported in the SS burst set, a, b, and n all are integers greater than 0, and n is less than or equal to N; and determining the quantity n of SS blocks according to the second indication information.

It should be noted that for functions of the functional units in the network device 10, the terminal device 20, the network device 30, and the terminal device 40 described in the embodiments of this application, refer to the related descriptions of the foregoing method embodiment in FIG. 1 to FIG. 4. Details are not described herein again.

An embodiment of this application further provides a computer storage medium. The computer storage medium may store a program, and when the program is executed, some or all steps of any information sending and receiving method recorded in the foregoing method embodiments are performed.

An embodiment of this application further provides a computer program, and the computer program includes an instruction. When the computer program is executed by a computer, the computer can perform some or all steps of any information sending and receiving method.

In the foregoing embodiments, the descriptions of the embodiments have respective focuses. For a part that is not described in detail in an embodiment, refer to related descriptions in other embodiments.

It should be noted that for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to example embodiments, and the involved actions and modules are not necessarily required by this application.

In the several embodiments provided in this application, it should be understood that the disclosed apparatuses may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer readable storage medium. Based on such an understanding, the technical solutions in this application essentially, or the part contributing to the prior art, or all or some of the technical solutions may be implemented in the form of a software product. The computer software product is stored in a storage medium and includes several instructions for instructing a computer device (which may be a personal computer, a server, or a network device, and may be specifically a processor in a computer device) to perform all or some steps of the foregoing methods described in the embodiments of this application. The foregoing storage medium may include any medium that can store program code, such as a USB flash drive, a removable hard disk, a magnetic disk, an optical disc, a read-only memory (ROM for short), or a random access memory (RAM for short).

The foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of this application.

What is claimed is:

1. An information sending method, wherein the method comprises:
    enabling, by a network device, a physical broadcast channel (PBCH) and a demodulation reference signal (DMRS) sequence of the PBCH respectively indicating part of bits of a synchronization signal (SS) block time index, the SS block time index being represented by M bits, Q bits of the M bits being carried in the PBCH, and (M-Q) bits of the M bits being implicitly carried by the DMRS sequence of the PBCH, M being an integer greater than 0, Q being an integer greater than 0 and Q being less than M, wherein the M bits are 6 bits, and the Q bits are 3 bits, and wherein 3 bits of the 6 bits are carried in the PBCH, and remaining 3 bits of the 6 bits are carried by the DMRS sequence of the PBCH; and
    sending, by the network device, the PBCH to a terminal device.

2. The method according to claim 1, wherein the Q bits are explicitly carried in the PBCH.

3. The method according to claim 1, wherein the (M-Q) bits of the M bits are corresponding to one of eight different DMRS sequences.

4. The method according to claim 1, wherein a value of M is associated with a quantity of SS blocks actually sent in an SS burst set.

5. The method according to claim 1, wherein a value of M is associated with a maximum quantity of SS blocks supported by different carrier band.

6. An information receiving method, wherein the method comprises:
    receiving, by a terminal, a physical broadcast channel (PBCH); and
    obtaining, by the terminal, a synchronization signal (SS block) time index, the SS block time index comprising M bits, part of bits of the M bits being implicitly carried by a demodulation reference signal (DMRS) sequence of the PBCH, and remaining part of bits of the M bits being carried in the PBCH, M being an integer greater than 0, wherein the M bits are 6 bits, and wherein 3 bits of the 6 bits are carried by the DMRS sequence of the PBCH, and remaining 3 bits of the 6 bits are carried in the PBCH.

7. The method according to claim 6, wherein 3 bits of the M bits are explicitly carried in the PBCH.

8. The method according to claim 6, wherein 3 bits of the M bits are corresponding to one of eight DMRS sequences.

9. The method according to claim 6, wherein a value of M is associated with a quantity of SS blocks actually sent in an SS burst set.

10. The method according to claim 6, wherein a value of M is associated with a maximum quantity of SS blocks supported by different carrier band.

11. The method according to claim 6, wherein the obtaining the SS block time index comprises:
    detecting, by the terminal, the PBCH and obtaining a data bits width of the PBCH; and
    obtaining, by the terminal, the SS block time index according to the data bits width of the PBCH.

12. The method according to claim 6, wherein the DMRS sequence of the PBCH is scrambled by a tertiary sequence (TSS).

13. The method according to claim 6, wherein the PBCH comprises 1 bit indicating whether the part of the bits of the M bits being implicitly carried by the DMRS sequence will be solved.

14. A network device, comprising:
    one or more memories configured to store instructions; and
    one or more processors coupled to the one or more memories and configured to execute the instructions, cause the network device to:

enable a physical broadcast channel (PBCH) and a demodulation reference signal (DMRS) sequence of the PBCH respectively indicating part of bits of a synchronization signal (SS) block time index, the SS block time index being representing by M bits, wherein Q bits of the M bits are carried in the PBCH, and (M-Q) bits are implicitly carried by the DMRS sequence of the PBCH, M is an integer greater than 0, Q is an integer greater than 0 and Q is less than M, wherein the M bits are 6 bits, and the Q bits are 3 bits, and wherein 3 bits of the 6 bits are carried in the PBCH, and wherein remaining 3 bits of the 6 bits are carried by the DMRS sequence of the PBCH; and send the PBCH to a terminal.

15. The network device according to claim 14, wherein the Q bits are explicitly carried in the PBCH.

16. The network device according to claim 14, wherein the (M-Q) bits are corresponding to one of eight different DMRS sequences.

17. The network device according to claim 14, wherein a value of M is associated with a quantity of SS blocks actually sent in an SS burst set.

18. The network device according to claim 14, wherein a value of M is associated with a maximum quantity of SS blocks supported by different carrier band.

19. A terminal device, comprising:
one or more memories configured to store instructions; and
one or more processors coupled to the one or more memories and configured to execute the instructions to cause the terminal device to:
receive a physical broadcast channel (PBCH); and
obtain information about a synchronization signal (SS) block time index, the SS block time index comprising M bits, wherein part of bits of the M bits are implicitly carried by a demodulation reference signal (DMRS) sequence of the PBCH, and remaining part of bits of the M bits are carried in the PBCH, and wherein M is an integer greater than 0, wherein the M bits are 6 bits, and wherein 3 bits of the 6 bits are carried by the DMRS sequence of the PBCH, and wherein remaining 3 bits of the 6 bits are carried in the PBCH.

20. The terminal device according to claim 19, wherein 3 bits of the M bits are explicitly carried in the PBCH.

21. The terminal device according to claim 19, wherein 3 bits are corresponding to one of eight different DMRS sequences.

22. The terminal device according to claim 19, wherein a value of M is associated with a quantity of SS blocks actually sent in an SS burst set.

23. The terminal device according to claim 19, wherein a value of M is associated with a maximum quantity of SS blocks supported by different carrier band.

24. The terminal device according to claim 19, wherein the one or more processors execute the instructions to cause the terminal device to:
detect the PBCH and obtain a data bits width of the PBCH; and
obtain the SS block time index according to the data bits width of the PBCH.

25. The terminal device according to claim 19, wherein the DMRS sequence of the PBCH is scrambled by a tertiary sequence (TSS).

26. The terminal device according to claim 19, wherein the PBCH comprises 1 bit indicating whether the part of the bits of the M bits being implicitly carried by the DMRS sequence will be solved.

* * * * *